US012786018B2

(12) United States Patent
Kim

(10) Patent No.: US 12,786,018 B2
(45) Date of Patent: Nov. 3, 2026

(54) INTERFERENCE CANCELLATION CIRCUIT AND OPERATING METHOD THEREOF, AND CHANNEL IMPULSE RESPONSE ESTIMATION CIRCUIT

(71) Applicant: SAMSUNG ELECTRONICS CO., LTD., Suwon-si (KR)

(72) Inventor: Joontae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/026,999

(22) Filed: Jan. 17, 2025

(65) Prior Publication Data

US 2025/0317334 A1 Oct. 9, 2025

(30) Foreign Application Priority Data

Apr. 4, 2024 (KR) ........................ 10-2024-0046221
Jul. 12, 2024 (KR) ........................ 10-2024-0092577

(51) Int. Cl.
*H04L 25/03* (2006.01)
*H04B 1/525* (2015.01)
*H04L 25/02* (2006.01)

(52) U.S. Cl.
CPC ......... *H04L 25/0328* (2013.01); *H04B 1/525* (2013.01); *H04L 25/0212* (2013.01)

(58) Field of Classification Search
CPC .. H04B 1/525; H04B 1/56; H04L 5/14; H04L 5/1423; H04L 5/1461; H04L 25/0202;
(Continued)

(56) References Cited

U.S. PATENT DOCUMENTS 8,767,869 B2 7/2014 Rimini et al.
9,713,010 B2 7/2017 Khandani
(Continued)

FOREIGN PATENT DOCUMENTS

CN 113676425 A 11/2021

OTHER PUBLICATIONS

Communication dated Jul. 11, 2025, issued by the European Patent Office in counterpart European Application No. 25167841.3.
(Continued)

*Primary Examiner* — Betsy Deppe
(74) *Attorney, Agent, or Firm* — Sughrue Mion, PLLC

(57) ABSTRACT

An interference cancellation circuit includes finite impulse response (FIR) filter configured to set a channel impulse response (CIR) coefficient for each transmission path for a transmission signal and obtain a CIR-adapted transmission signal by applying the CIR coefficient to the transmission signal, a kernel generation circuit configured to generate an interference model based on the CIR-adapted transmission signal, an adaptive filter configured to estimate an interference signal for each reception path by estimating an interference model coefficient for the interference model and generate an interference-cancelled signal by filtering out the interference signal from a reception signal, and a CIR estimation circuit configured to estimate the CIR coefficient in a next sample period based on the interference-cancelled signal through a backpropagation method and transmit the estimated CIR coefficient to the FIR filter.

20 Claims, 14 Drawing Sheets

(58) Field of Classification Search
CPC ............ H04L 25/0204; H04L 25/0212; H04L 25/0328
See application file for complete search history.

(56) References Cited

U.S. PATENT DOCUMENTS

| | | | | |
|---|---|---|---|---|
| 9,887,728 | B2 | 2/2018 | Jain et al. | |
| 9,906,262 | B2 | 2/2018 | Hua | |
| 10,038,462 | B2 | 7/2018 | Gomaa et al. | |
| 10,243,719 | B2 | 3/2019 | Bharadia et al. | |
| 10,541,840 | B2 | 1/2020 | Moorti et al. | |
| 10,797,745 | B2 * | 10/2020 | Kim | H04B 1/525 |
| 11,101,841 | B2 * | 8/2021 | Noest | H04B 1/525 |
| 11,277,284 | B2 * | 3/2022 | Kwon | H04L 25/0212 |
| 11,528,049 | B2 * | 12/2022 | Lee | H04L 5/14 |
| 2023/0111317 | A1 | 4/2023 | Venkatraman et al. | |
| 2023/0325001 | A1 | 10/2023 | Gigie et al. | |
| 2023/0344614 | A1 | 10/2023 | Xue et al. | |

OTHER PUBLICATIONS

C. Auer et al., “Kernel Recursive Least Squares Based Cancellation of Second-Order Intermodulation Distortion”, 2020 54th Asilomar Conference on Signals, Systems, and Computers, IEEE, Nov. 2020, Total 6 pages, XP033921340.

C. Kezi Selva Vijila et al. “Cancellation of ECG in Electromyogram Using Back Propagation Network”, 2009 International Conference on Advances in Recent Technologies in Communication and Computing, Oct. 2009, pp. 630-634, Total 6 pages, XP031564257.

Kim Daeyoung et al: “Adaptive Time Synchronization between Transmitters in Digital Self-interference Cancellation Systems”, 2023 IEEE 97th Vehicular Technology Conference (VTC2023-Spring), IEEE, Jun. 20, 2023, pp. 1-8, XP034397843.

Extended European Search Report issued Nov. 20, 2025 by the European Patent Office for EP Patent Application No. 25167841.3.

* cited by examiner

FIG. 7

| Aggressor TX path number | Interference type | Mathematical model $g_n = f(y_{0,n}, y_{1,n})$ | Wirtinger derivative for TX 0 path and m-th tap | | Wirtinger derivative for TX 1 path and m-th tap | |
|---|---|---|---|---|---|---|
| | | | $\frac{\partial g_n}{\partial h^*_{0,m}}$ | $\frac{\partial g^*_n}{\partial h^*_{0,m}}$ | $\frac{\partial g_n}{\partial h^*_{1,m}}$ | $\frac{\partial g^*_n}{\partial h^*_{1,m}}$ |
| 1 | 2nd Har. | $g_n = y^2_{0,n}$ | $2y_{0,n}x_{0,n-m}$ | 0 | N/A | N/A |
| | 3rd Har. | $g_n = y^3_{0,n}$ | $3y^2_{0,n}x_{0,n-m}$ | 0 | N/A | N/A |
| | Reciprocal mixing(3rd) | $g_n = y^*_{0,n}$ | 0 | | N/A | N/A |
| | Reciprocal mixing(5th) | $g_n = y_{0,n}$ | $x_{0,n-m}$ | 0 | N/A | N/A |
| | IM2 | $g_n = y_{0,n}y^*_{0,n}$ | $y^*_{0,n}x_{0,n-m}$ | $y^*_{0,n}x_{0,n-m}$ | N/A | N/A |
| 2 | IMD2 | $g_n = y_{0,n}y_{1,n}$ | $y_{1,n}x_{0,n-m}$ | 0 | $y_{0,n}x_{1,n-m}$ | 0 |
| | | $g_n = y_{0,n}y^*_{1,n}$ | $y^*_{1,n}x_{0,n-m}$ | 0 | 0 | $y^*_{0,n}x_{1,n-m}$ |
| | IMD3 | $g_n = y_{0,n}(y^*_{1,n})^2$ | $(y^*_{1,n})^2x_{0,n-m}$ | 0 | 0 | $2y_{0,n}y^*_{1,n}x_{1,n-m}$ |
| | IMD3 | $g_n = y_{0,n}y^2_{1,n}$ | $y^2_{1,n}x_{0,n-m}$ | 0 | $2y_{0,n}y_{1,n}x_{1,n-m}$ | 0 |
| | IMD3 | $g_n = y^2_{0,n}y^*_{1,n}$ | $2y_{0,n}y^*_{1,n}x_{0,n-m}$ | 0 | 0 | $(y^*_{0,n})^2x_{1,n-m}$ |
| | IMD3 | $g_n = y^2_{0,n}y_{1,n}$ | $2y_{0,n}y_{1,n}x_{0,n-m}$ | 0 | $(y_{0,n})^2x_{1,n-m}$ | 0 |
| | IMD5 | $g_n = y^3_{0,n}, y^*_{1,n}, y^*_{1,n}$ | $3y^2_{0,n}y^*_{0,n}y^*_{1,n}x_{0,n-m}$ | $(y^*_{0,n})^3y_{1,n}x_{0,n-m}$ | 0 | $(y^*_{0,n})^3y_{0,n}x_{1,n-m}$ |

INTERFERENCE CANCELLATION CIRCUIT AND OPERATING METHOD THEREOF, AND CHANNEL IMPULSE RESPONSE ESTIMATION CIRCUIT

CROSS-REFERENCE TO RELATED APPLICATION

This application is based on and claims priority under 35 U.S.C. § 119 to Korean Patent Applications No. 10-2024-0046221, filed on Apr. 4, 2024, and No. 10-2024-0092577, filed on Jul. 12, 2024, respectively, in the Korean Intellectual Property Office, the disclosures of which are incorporated by reference herein in their entireties.

BACKGROUND

One or more embodiments of the present disclosure relate to an interference cancellation circuit and an operating method thereof, and more particularly, to an interference cancellation circuit configured to cancel intermodulation interference based on relative delay between transmission signals and an operating method of the interference cancellation circuit.

Various methods may be employed in wireless communication systems to increase throughputs. These methods may include Carrier Aggregation (CA), Evolved Universal Terrestrial Radio Access (E-UTRA) New Radio (NR) Dual Connectivity (EN-DC), Multiple-Input and Multiple-Output (MIMO), and the like, and increase communication capacity by using a plurality of antennas. As throughput-enhancing techniques are employed, it may be required for a transmission end to handle complex transmission signals, while a reception end is capable of processing reception signals having high complexity.

Interference signals may interfere the reception end, preventing the correct processing of signals received through an antenna. These interference signals may take various forms. For example, an inter cell interference may arise from a neighboring base station at a boundary of a serving base station, while an intra cell interference may occur due to a wireless signal from another terminal within a coverage area of the serving base station. Other types of interference, such as a channel interference, may also be encountered.

In addition to the interference signals received through the antenna, there also may be interference signals occurring as transmission signals leak through reception paths or are coupled onto the reception paths within terminals. As for self-interference signals occurring in terminals, transmission signals are fed back as interference signals, and thus, may significantly influence degradation of reception sensitivity. Recently, technical developments have been actively made to remove interference signals caused by intermodulation distortion (IMD) between transmission signals received through a plurality of transmission paths. More particularly, as the bandwidth for data transmission increases, leading to frequency selectivity in the transmission path, memory terms can be introduced during processing when there is frequency selectivity in accordance with an increase in a bandwidth for data transmission in a transmission path, memory terms may be generated in a process in a transmission path. These memory terms may arise before a non-linear model (e.g., a kernel generation circuit), as well as after in an interference cancellation process. Accordingly, in order to effectively cancel interference signals, a solution that incorporates a memory term for each transmission path in the interference model may be required.

SUMMARY

One or more embodiments provide a channel impulse response (CIR) estimation circuit configured to estimate a CIR coefficient for each transmission path, an interference cancellation circuit including the CIR estimation circuit, and operating methods thereof.

According to an aspect of the disclosure, there is provided an interference cancellation circuit including a finite impulse response (FIR) filter configured to set a channel impulse response (CIR) coefficient for each transmission path for a transmission signal and obtain a CIR-adapted transmission signal by applying the CIR coefficient to the transmission signal; a kernel generation circuit configured to generate an interference model based on the CIR-adapted transmission signal; an adaptive filter configured to estimate an interference signal for each reception path by estimating an interference model coefficient for the interference model and generate an interference-cancelled signal by filtering out the interference signal from a reception signal; and a CIR estimation circuit configured to estimate the CIR coefficient in a next sample period based on the interference-cancelled signal through a backpropagation method and transmit the estimated CIR coefficient to the FIR filter.

According to another aspect of the disclosure, there is provided an interference cancellation circuit including a finite impulse response (FIR) filter configured to set a channel impulse response (CIR) coefficient for each transmission path for a transmission signal and obtain a CIR-adapted transmission signal by applying the CIR coefficient to the transmission signal; a kernel generation circuit configured to generate an interference model based on the CIR-adapted transmission signal; a cancellation circuit configured to generate an interference-subtracted signal by subtracting an interference signal, which is estimated based on the interference model, from a reception signal; and a CIR estimation circuit configured to estimate the CIR coefficients in a next sample periods by using a backpropagation method based on the interference-subtracted signal, and transmit the estimated CIR coefficients to the FIR filter According to another aspect of the disclosure, there is provided an operating method of a channel impulse response (CIR) estimation circuit, the operating method including: generating a target delay signal for updating CIR coefficients from among a plurality of delay signals, based on a transmission path index and a delay index; performing a backpropagation process on the target delay signal; estimating a CIR coefficient for the target delay signal, based on a result of the performing of the backpropagation process; and transmitting the estimated CIR coefficient to a finite impulse response (FIR) filter to update the estimated CIR coefficient to a CIR coefficient of the target delay signal in a next sample period.

BRIEF DESCRIPTION OF DRAWINGS

Embodiments will be more clearly understood from the following detailed description taken in conjunction with the accompanying drawings in which:

FIG. 7 is a diagram to describe operations of a CIR estimation circuit according to one or more embodiments;

DETAILED DESCRIPTION OF EMBODIMENTS

Figure 1:
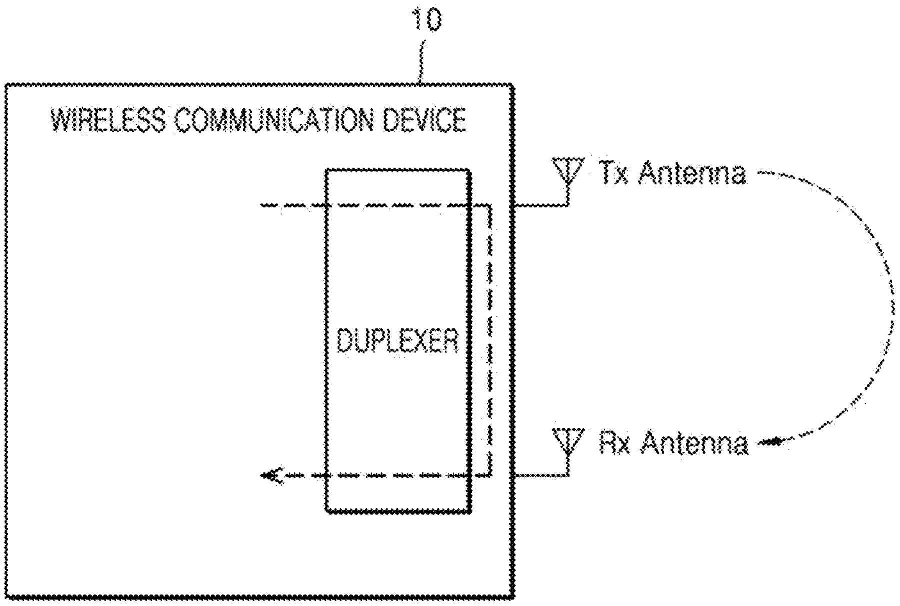
FIG. 1 illustrates a wireless communication device experiencing self-interference caused by a transmission signal according to one or more embodiments.

Embodiments will be described in detail with reference to the accompanying drawings. Although embodiments are illustrated in the drawings and detailed descriptions thereof are written herein, it is not intended to limit various embodiments in specific forms. For example, it would be obvious to those of skill in the art that the embodiments may be variously modified.

One or more embodiments provide a wireless communication device (e.g., a terminal) including an interference cancellation circuit or a channel impulse response (CIR) estimation circuit to perform wireless communication through at least one transmission path such as an antenna.

In the present specification, BPP may indicate a back-propagation process.

FIG. 1 illustrates a wireless communication device experiencing self-interference caused by a transmission signal according to one or more embodiments.

Referring to FIG. 1, a wireless communication device 10 may include a transmission antenna and a reception antenna. The wireless communication device 10 may be implemented to have a single antenna connected to both a transmission radio-frequency (RF) chain and a reception RF chain through a duplexer. For example, the wireless communication device 10 may be configured to receive a wireless signal through the reception RF chain in a receiving mode and transmit a baseband signal to an external device through the transmission RF chain in a transmitting mode.

According to various embodiments, in the wireless communication device 10 including the transmission antenna and the reception antenna connected through the duplexer, feedback of the transmission signal may occur based on the transmission antenna and the reception antenna adjacent to each other. However, as the duplexer is connected to both the transmission RF chain and the reception RF chain, at least a portion of the transmission signal may leak from the transmission RF chain to the receiving RF chain. When the leaked transmission signal is input to the reception RF chain, self-interference may occur.

According to various embodiments, the reception antenna may be configured to receive wireless signals transmitted from the transmission antenna, as well as wireless signals transmitted from the external device. For example, when the transmission antenna and the reception antenna correspond to non-directional antennas and the transmission antenna and the reception antenna are arranged adjacent to each other, some of the transmitted wireless signals may be fed back through the reception antenna. Self-interference may also occur based on the wireless signals fed back.

Figure 2:
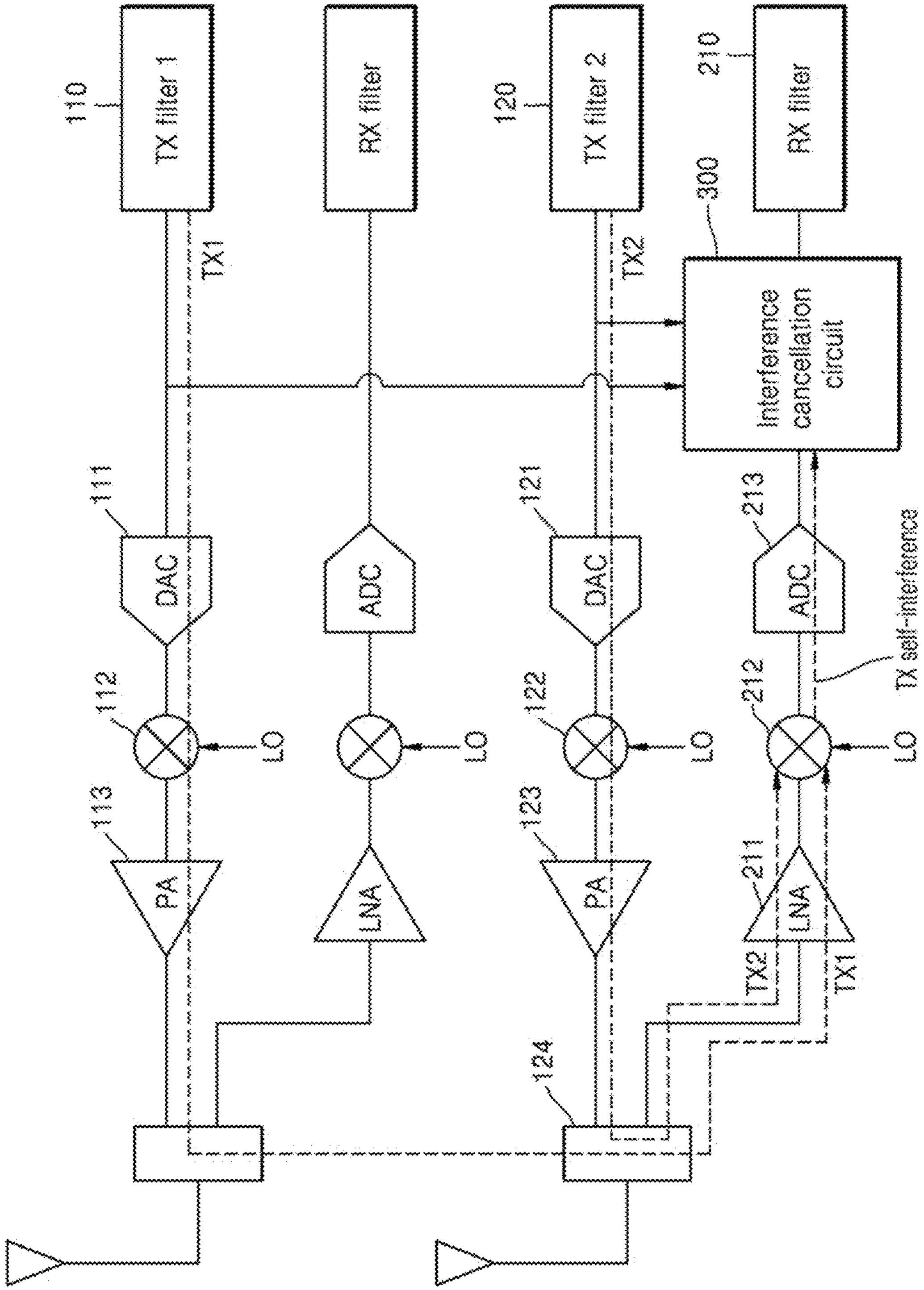
FIG. 2 illustrates an example of a wireless communication device according to one or more embodiments.

FIG. 2 illustrates an example of the wireless communication device 10 according to one or more embodiments.

Referring to FIG. 2, the wireless communication device 10 may include two antennas to transmit a first transmission signal TX1 and a second transmission signal TX2, respectively. Each of the two antennas may include antennas for transmitting and receiving signals.

For example, a first transmission filter 110 may filter an input signal to output the first transmission signal TX1 having only a desired frequency band. A first digital-to-analog converter (DAC) 111 may convert the first transmission signal TX1 in a digital signal form to an analog signal. Thereafter, a first mixer 112 may perform up-conversion on a transmission frequency of the first transmitted signal TX1 by mixing the first transmitted signal TX1 with a (high frequency) local oscillator (LO) frequency received from an LO. A first power amplifier (PA) 113 may amplify the up-converted first transmitted signal TX1 and then transmit it to the external device (e.g., a base station) through the antenna. A second transmission filter 120 filter an input signal to output the second transmission signal TX2 having only a desired frequency band. A second DAC 121 may convert the second transmission signal TX2 in a digital signal form to an analog signal. Thereafter, a second mixer 122 perform up-conversion on a transmission frequency of the second transmission signal TX2 by mixing the second transmission signal TX2 with a (high frequency) LO frequency. A second PA 123 may amplify the up-converted second transmitted signal TX2 and then may transmit it to the external device through the antenna.

According to various embodiments, the wireless communication device 10 may be configured to perform carrier aggregation or dual connectivity, with the first transmission filter 110, the second transmission filter 120, and a reception filter 210 all being in an active state. Here, when self-interference occurs, the first transmission signal TX1 amplified through the first PA 113 may be coupled to a neighboring reception RF chain. For example, the first transmission signal TX1 may be input as a reception signal to a low noise amplifier (LNA) 211 of the receiving RF chain. In addition, the second transmission signal TX2 may leak from the transmission RF chain connected through a duplexer 124. That is, the second transmission signal TX2 may be input as the reception signal to the LNA 211 through the duplexer 124. The first transmission signal TX1 and the second transmission signal TX2 may generate an interference signal around the reception frequency due to non-linear characteristics of the reception RF chain. The interference signal may again undergo down-conversion by the LO frequency received by the third mixer 212, and then may be converted to a digital signal through an analog-to-digital converter (ADC) 213. Thereafter, the interference signal generated by the first transmission signal TX1 and the second transmission signal TX2 may be cancelled by the interference cancellation circuit 300.

The interference cancellation circuit 300 may further include a pre-process circuit 310, a finite impulse response (FIR) filter 320, a kernel generation circuit 330, a post-process circuit 340, and an adaptive filter 350. Details thereof will be described below with reference to FIG. 3.

Figure 3:
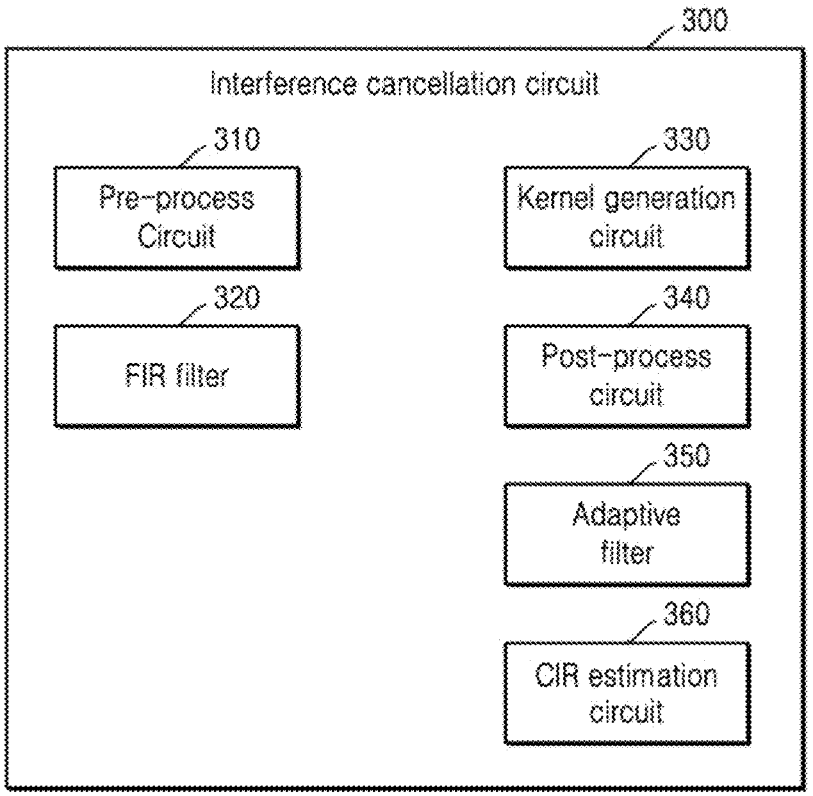
FIG. 3 illustrates an example of an interference cancellation circuit according to one or more embodiments.

The interference cancellation circuit 300 illustrated in FIG. 2 is described in terms of operations of generating the interference signal by modeling the first transmission signal TX1 and the second transmission signal TX2 received by the interference cancellation circuit 300 and cancelling the interference based thereon, and the interference cancellation circuit 300 illustrated in FIG. 3 is described in terms of functions of cancelling various kinds of interference.

FIG. 3 illustrates an example of the interference cancellation circuit 300 according to one or more embodiments.

Referring to FIG. 3, the interference cancellation circuit 300 may include the pre-process circuit 310, the FIR filter 320, the kernel generation circuit 330, the post-process circuit 340, and the adaptive filter 350 and a CIR estimation circuit 360.

The pre-process circuit 310 may be configured to receive the transmission signals from at least one transmission path and perform at least one pre-process on the transmission signals transmitted through different transmission paths. The at least one pre-process may include an operation regarding at least one of delay matching between the transmission signals, delay matching between the interference signals in a transmission path, adjustment on a sampling rate, and/or combinations thereof.

The FIR filter (e.g., a linear model) 320 may be configured to set a CIR coefficient corresponding to the transmission signal (or a pre-processed transmission signal) for the transmission signal (or the pre-processed transmission signal).

In one or more embodiments, the FIR filter 320 may include a plurality of buffers. The FIR filter 320 may be configured to generate a first delay signal to a $n^{th}$ delay signal by delaying the transmission signal by each of delay periods (e.g., sample periods of the interference signals may include $Z^{-1}, Z^{-2}, \ldots, Z^{-(n-1)}$) set for the plurality of buffers, by using the plurality of buffers (see FIG. 5). For example, the FIR filter 320 may be configured to generate the first delay signal by delaying the transmission signal by a zeroth delay period set for a first buffer (where the zeroth delay period may indicate 'a sample period of the interference signal*0 (e.g., $Z^{-0}$)), based on the first buffer, generate the second delay signal by delaying the transmission signal by a first delay period set for a second buffer (where the first delay period may indicate 'a sample period of the interference signal*1 (e.g., $Z^{-1}$))', based on the second buffer, generate a third delay signal by delaying the transmission signal by a second delay period set for a third buffer (where the second delay period may indicate 'the sample period of the interference signal*2 (i.e.: $Z^{-2}$)), based on the third buffer, and generate the $n^{th}$ delay signal by delaying the transmission signal by a n-$1^{th}$ delay period set for an $n^{th}$ buffer (where the n-$1^{th}$ delay period may indicate 'the sample period of the interference signal*(n-1) (e.g., $Z^{-(n-1)}$), based on the nth buffer (n is a natural number greater than or equal to 1).

Figure 5:
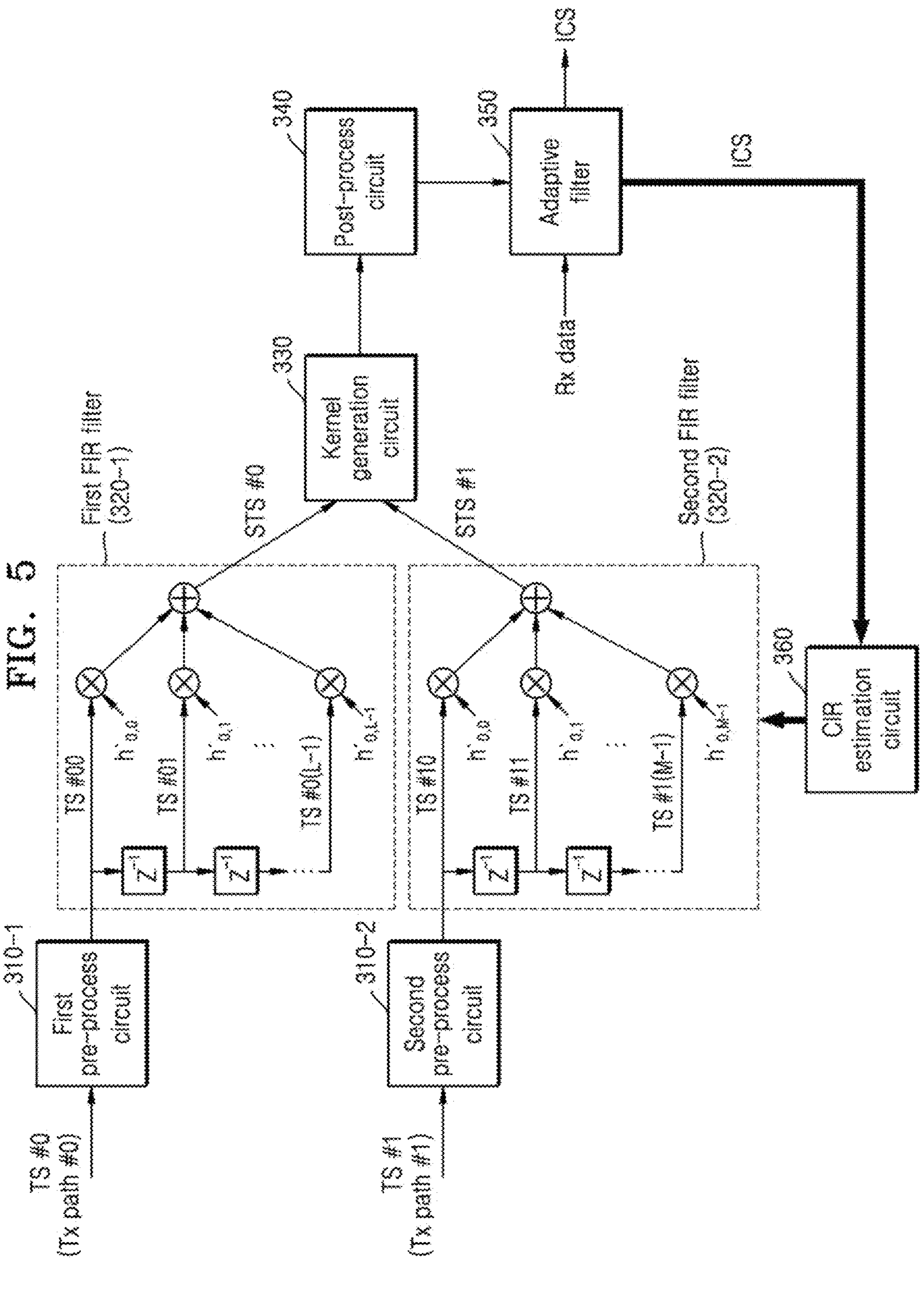
FIG. 5 is a diagram to describe operations of an interference cancellation circuit according to one or more embodiments.

In one or more embodiments, for the first delay signal to the $n^{th}$ delay signal, the FIR filter 320 may set CIR coefficients respectively corresponding to the first delay signal to the $n^{th}$ delay signal (see FIG. 5).

The kernel generation circuit (e.g., a non-linear model) 330 may include a circuit configured to generate (or reproduce) an interference model (see FIG. 8) by receiving the interference signals (e.g., the first transmission signal TX1 and the second transmission signal TX2). The reproduced interference model may include both an active interference signal and a passive interference signal.

In one or more embodiments, the kernel generation circuit 330 may be configured to receive the transmission signals for which CIR coefficients are set (e.g., aggregation signals STS #0 to STS #1 generated by aggregating of the first delay signal to the $n^{th}$ delay signal for which CIR coefficients are set), from the FIR filter 320, and generate (or reproduce) the interference model (see FIG. 8) based on the aggregation signals.

The post-process circuit 340 may be configured to perform at least one post-process on the interference model received from the kernel generation circuit 330. The at least one post-process may include an operation regarding at least one of delay matching between the transmission signals and the reception signal, regulation on frequency offset, adjustment on a sampling rate, and/or combinations thereof.

The adaptive filter (e.g., a linear model) 350 may estimate (or generate) an interference signal by estimating a coefficient of the kernel generation circuit 330 and perform filtering on the interference signal by subtracting and filtering out the interference signal from the reception signal. For example, the adaptive filter 350 may be configured to generate an interference-cancelled signal by filtering out the interference signal from the reception signal. For example, the adaptive filter 350 may operate based on one of adaptive filter algorithms, e.g., a least mean square (LMS) algorithm using a stochastic gradient descent method, a recursive least squares (RLS) algorithm, and a dichotomous coordinate descent (DCD)-RLS algorithm. The adaptive filter 350 may transmit the interference-cancelled signal to the CIR estimation circuit 360.

The interference-cancelled circuit according to the embodiments may include a cancellation circuit in the place of the adaptive filter 350. Here, the cancellation circuit may be configured to estimate an interference signal, based on the interference model, and generate an interference-subtracted signal by subtracting the interference signal estimated from the reception signal. The cancellation circuit may be configured to transmit the interference-subtracted signal to the CIR estimation circuit 360. Details thereof will be described below with reference to FIGS. 10 and 12.

The CIR estimation circuit 360 may be configured to estimate the CIR coefficients in a next sample period by using a backpropagation method, based on any one of the interference-cancelled signal (received from the adaptive filter 350) and the interference-subtracted signal (received from the cancellation circuit), and may transmit the estimated CIR coefficients to the FIR filter to update the CIR coefficient.

In one or more embodiments, the CIR estimation circuit 360 may be configured to estimate CIR coefficients respectively corresponding to the first delay signal to the $n^{th}$ delay signal in the next sample period, by using the backpropagation method based on the interference-cancelled signal. The CIR estimation circuit 360 may be configured to transmit the CIR coefficients respectively corresponding to the first delay signal to the $n^{th}$ signal in the next sample period, to the FIR filter 320, and the FIR filter 320 may be configured to update the CIR coefficients, which are received from the CIR estimation circuit 360, to CIR coefficients respectively corresponding to the first delay signal and the $n^{th}$ delay signal in the next sample period.

In one or more embodiments, the CIR estimation circuit 360 may be configured to estimate the CIR coefficients respectively corresponding to the first delay signal to the $n^{th}$ delay signal in the next sample period, by using the backpropagation method based on the interference-subtracted signal. The CIR estimation circuit 360 may be configured to transmit the CIR coefficients respectively corresponding to the first delay signal to the $n^{th}$ delay signal in the next sample period, to the FIR filter 320, and the FIR filter 320 may be configured to update the CIR coefficients, which are received from the CIR estimation circuit 360, to the CIR coefficients respectively corresponding to the first delay signal and the $n^{th}$ delay signal in the next sample period.

In one or more embodiments, the CIR estimation circuit 360 may be configured to estimate the CIR coefficients respectively corresponding to the first delay signal to the $n^{th}$ delay signal in the next sample period, by using the backpropagation method based on a Wirtinger derivative method and/or a chain rule). Details thereof will be described below with reference to FIGS. 5 to 8.

According to the CIR estimation circuit 360, the interference cancellation circuit 300, and operating methods thereof in the embodiments, estimating a CIR coefficient for each transmission path and reflecting the CIR coefficient to interference modeling may allow for effective cancellation of intermodulation distortion (IMD) interference, without significant changes to a structure of an interference cancellation circuit. Additionally, the system may be configured more compactly, and the inventive concept may be implemented with low system complexity.

According to the CIR estimation circuit 360, the interference cancellation circuit 300, and operating methods thereof, in the embodiments, even when transmission/reception delay occurs due to an analog element or a digital element of a wireless communication device, IMD interference may be effectively cancelled by reflecting delay for each transmission path.

Figure 4:
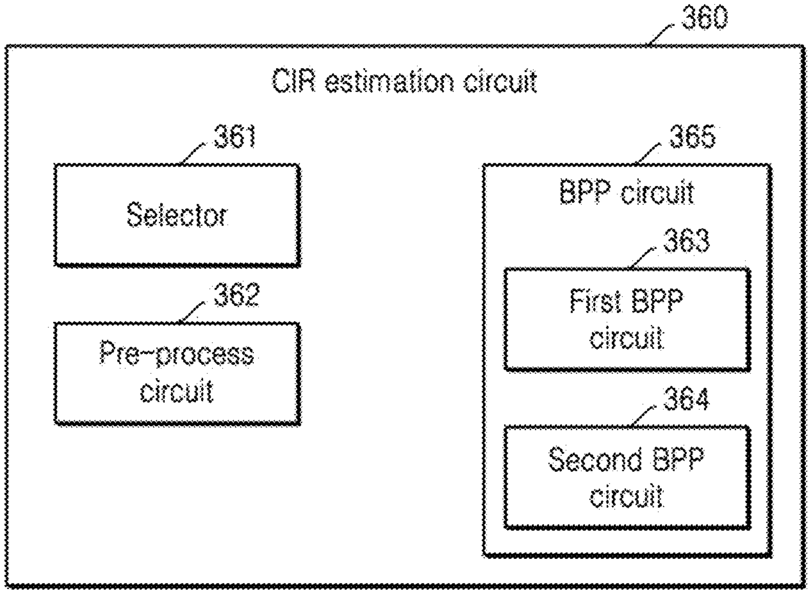
FIG. 4 illustrates an example of a channel impulse response (CIR) estimation circuit, according to another embodiment.

FIG. 4 illustrates the CIR estimation circuit 360 according to another embodiment.

Referring to FIG. 4, the CIR estimation circuit 360 may include a selector 361, a pre-process circuit 362, and a backpropagation processing (BPP) circuit 365 including a first BPP circuit 363 and a second BPP circuit 364.

The selector 361 may be configured to determine a target delay signal, which is used for updating the CIR coefficients, from among a plurality of delay signals (e.g., the first delay signal to the $n^{th}$ delay signal shown in FIG. 3). The selector 361 may include a first selector and a second selector. The first selector may be configured to calculate/select a transmission (Tx) path index t for determining the target delay signal, and the second selector may be configured to calculate/select a delay index m (see FIG. 6). For example, referring to FIG. 5, when '0' is selected as the Tx path index t and '1' is selected as the delay index m, the selector 361 may determine a second delay signal TS #01, which is a transmission signal delayed by a second delay period (e.g., (a sample period)*2) in a first transmission path Tx0, as the target delay signal.

The pre-process circuit 362 may be configured to perform at least one pre-process on each of a plurality of transmission signals (e.g., a transmission signal TS #0 of the zeroth transmission path or a transmission signal TS #1 of the first transmission path) delivered through the transmission path selected by the selector 361 (e.g., the first selector). The at least one pre-process may include an operation regarding at least one of delay matching between transmission signals respectively received through different transmission paths, delay matching between interference signals in the transmission paths, adjustment on a sampling rate, and/or combination thereof.

The BPP circuit 365 may be configured to, by using the backpropagation based on the interference-cancelled signal, estimate CIR coefficients for delay signals of the transmission paths in the next sample period and effectively cancel interference signals by reflecting the estimated CIR coefficients to interference modeling. Here, the backpropagation method may be based on the Wirtinger derivative method and the chain rule.

The BPP circuit 365 may be configured to estimate the CIR coefficients $$h_{t,m}^{next}$$

for the delay signals m for the transmission paths in the next sample period, based on Equation 1 below (where t indicates a Tx path index and m indicates a delay index).

$$h_{t,m}^{next} \leftarrow h_{t,m}^{previous} - 2\mu\frac{\partial \mathcal{L}_n}{\partial h_{t,m}^*} \qquad \text{[Equation 1]}$$

Here, $$h_{t,m}^{previous}$$

may indicate a CIR coefficient for a delay signal of each of the transmission paths in a previous sample period, μ may indicate a step size, and $$\frac{\partial \mathcal{L}_n}{\partial h_{t,m}^*}$$

may indicate a Writinger derivative for the CIR coefficient $$h_{t,m}^*$$

in the delay signal m for each of the transmission paths of a loss function $\mathcal{L}_n$ .

In [Equation 1], due to complexity in an actual calculation process, it may be difficult to directly calculate the Wirtinger derivative $$\frac{\partial \mathcal{L}_n}{\partial h_{t,m}^*}$$

for the CIR coefficient $$h_{t,m}^*$$

from the delay signal m for each of the transmission paths of the loss function $\mathcal{L}_n$ .

Accordingly, the BPP circuit 365 of the CIR estimation circuit 360, according to the embodiment, may be configured to calculate processes from pre-processing (performed by the pre-process circuit 310) to the loss function $\mathcal{L}_n$ calculation (performed by the CIR estimation circuit 360) in the interference cancellation circuit 300, by using the back-propagation method based on the Wirtinger derivative and the chain rule. In one or more embodiments, the BPP circuit 365 may include the first BPP circuit 363 configured to calculate Wirtinger derivatives for the adaptive filter 350 and the kernel generation circuit 330 by using the backpropagation method. In one or more embodiments, the BPP circuit 365 may include the second BPP circuit 364 configured to calculate a Wirtinger derivative for at least one circuit configured to perform a post-process (see an operation of the post-process circuit 340 in FIG. 5) in the interference cancellation circuit 300 by using the backpropagation method.

In a process of calculating the Wirtinger derivative, a process of calculating a derivative for a conjugate term (e.g., a conjugate path) and a process of calculating a derivative for an original term (e.g., a non-conjugate path) are separately performed, and therefore, the BPP circuit 365 according to the embodiments may include a BPP circuit for the conjugate path and a BPP circuit for the non-conjugate path. For example, referring to FIG. 6, a first BPP circuit #1 363-1 may include the BBP circuit for the non-conjugate path when calculating Wirtinger derivatives for the adaptive filter 350 and the kernel generation circuit 330, and a first BPP circuit #2 363-2 may include the BPP circuit for the conjugate path when calculating Wirtinger derivatives for the adaptive filter 350 and the kernel generation circuit 330. For example, referring to FIG. 6, a second BPP circuit #1 364-1 may include the BPP circuit for the non-conjugate path when calculating a Wirtinger derivative for at least one circuit configured to perform a post-process in the interference cancellation circuit 300, and a second BPP circuit #2 364-2 may include the BPP circuit for the conjugate path when calculating a Wirtinger derivative for at least one circuit configured to perform a post-process.

More particularly, an operation of estimating the CIR coefficients $$h_{t,m}^{next}$$

in the next sample period by calculating the Wirtinger derivative $$\frac{\partial \mathcal{L}_n}{\partial h_{t,m}^*}$$

of the BPP circuit 365 is as follows.

The BPP circuit 365 may be configured to calculate an error signal $e_{r,n}$ (i.e., the interference-cancelled signal) in an $r^{th}$ transmission path, based on [Equation 2] below.

$$e_{r,n} = (d_{r,n} - Z_{r,ADo,n}) \quad \text{[Equation 2]}$$

Here, $Z_{r,ADo,n}$ may indicate an interference signal value (or an estimated value of the interference signal), and $d_{r,n}$ may indicate a received signal (or a downlink signal) actually received.

In one or more embodiments, when a plurality of reception signals are received through a plurality of reception paths, the BPP circuit 365 may generate a plurality of error signals (i.e., a plurality of interference-cancelled signals) in a plurality of reception paths and calculate the loss function $\mathcal{L}_n$ by applying a predetermined weight to each of the plurality of error signals) (i.e., the plurality of interference-cancelled signals). The BPP circuit 365 may be configured to calculate the loss function $\mathcal{L}_n$ based on [Equation 3] below. The BPP circuit 365 may be configured to estimate the CIR coefficient $$h_{t,m}^{next}$$

in the next sample period by calculating the Wirtinger derivative $$\frac{\partial \mathcal{L}_n}{\partial h_{t,m}^*}$$

for the CIR coefficient $$h_{t,m}^*$$

from the delay signal m for each of the transmission path of the loss function $\mathcal{L}_n$ by using the backpropagation method based on the loss function $\mathcal{L}_n$ (where the loss function $\mathcal{L}_n$ corresponds to the interference-cancelled signal) (see Equation 1).

$$\mathcal{L}_n = \sum_{r \in RX\ paths} w_r |d_{r,n} - Z_{r,ADo,n}|^2 \quad \text{[Equation 3]}$$

Here, $W_r$', i.e., the weight for the $r^{th}$ reception path, may be defined by equal combining or various combining methods. Here, even when the loss functions $\mathcal{L}_n$ for all of the plurality of reception signals are calculated, the BPP circuit 365 according to the embodiments may be more widely implemented in a brief structure (e.g., an aggregation structure) by calculating the loss functions $\mathcal{L}_n$ for all of the plurality of reception signals in a method of sum of magnitude.

In one or more embodiments, when the plurality of reception signals are received through a plurality of reception paths, the BPP circuit 365 may generate the plurality of error signals (i.e., the plurality of interference-cancelled signals) in the plurality of transmission paths and identify a transmission path in which interference is strongest (that is, having greatest intensity of the interference signal) from among the plurality of error signals (i.e., the plurality of interference-cancelled signals). The BPP circuit 365 may be configured to calculate a loss function $\mathcal{L}_n$ for the reception path in which the interference is strongest (that is, having the greatest intensity of the interference signal). The BPP circuit 365 may be configured to calculate the loss function $\mathcal{L}_n$ based on [Equation 4] below. The BPP circuit 365 may be configured to estimate the CIR coefficient $$h_{t,m}^{next}$$

in the next sample period by calculating the Wirtinger derivative $$\frac{\partial \mathcal{L}_n}{\partial h_{t,m}^*}$$

for the CIR coefficient $$h_{t,m}^*$$

from the delay signal m for each of the transmission paths of the loss function $\mathcal{L}_n$ by using the backpropagation method based on the loss function $\mathcal{L}_n$ (where the loss function $\mathcal{L}_n$ corresponds to the interference-cancelled signal) (see Equation 1).

$$\mathcal{L}_n = |d_{r=R,n} - Z_{r=R,ADo,n}|^2 \quad \text{[Equation 4]}$$

Here, R may indicate the reception path in which the interference is the strongest (that is, having the greatest intensity of the interference signal).

In one or more embodiments, when the BPP circuit 365 calculates the Wirtinger derivative $$\frac{\partial \mathcal{L}_n}{\partial h_{t,m}^*}$$

based on a plurality of the loss functions $\mathcal{L}_n$, a sum $\mathcal{L}_n^r$ of the loss functions $\mathcal{L}_n$ may be used instead of the loss function $\mathcal{L}_n$. Here, the BPP circuit 365 may be configured to calculate the sum $\mathcal{L}_n^r$ of the loss functions $\mathcal{L}_n$ based on [Equation 5] below.

$$\mathcal{L}_n^r = \sum_n \mathcal{L}_n \quad \text{[Equation 5]}$$

Here, n may indicate a sample index of the interference signal. Here, as the sum $\mathcal{L}_n^r$ of the loss functions $\mathcal{L}_n$ is a linear combination of the loss functions $\mathcal{L}_n$, the BPP circuit 365 according to the embodiments may be configured to calculate the sum $\mathcal{L}_n^r$ of the loss functions $\mathcal{L}_n$ using the sum of magnitudes method and may be effectively implemented in a simplified structure (e.g., the aggregation structure).

The first BPP circuit 363 may be configured to receive the interference-cancelled signal from the adaptive filter 350 (see FIG. 5). The first BPP circuit 363 may be configured to perform a first backpropagation process with respect to the target delay signal, based on the interference-cancelled signal. Here, the first backpropagation process may indicate a backpropagation process for the adaptive filter 350 configured to generate the interference-cancelled signal and the kernel generation circuit 330 configured to generate the interference model corresponding to the interference signal.

The first BPP circuit 363 may be configured to receive the interference-subtracted signal from the cancellation circuit. The first BPP circuit 363 may be configured to perform a third backpropagation process with respect to the target delay signal, based on the interference-subtracted signal. Here, the third backpropagation process may indicate a backpropagation process for the cancellation circuit configured to generate the interference-subtracted signal and the kernel generation circuit 330 configured to generate an interference model corresponding to the interference signal. Representative Wirtinger derivatives (e.g. the kernel generation circuit 330) or the filter (e.g., the adaptive filter 350) in the first backpropagation process or the third backpropagation process will be described below with reference to FIG. 8.

The second BPP circuit 364 may be configured to perform a second backpropagation process with respect to the target delay signal, based on a result of the performing of the first backpropagation process. Here, the second backpropagation process may indicate a backpropagation process for at least one circuit configured to perform the post-process (see operations of the post-process circuit 340 in FIG. 5) with respect to the interference signal. The first backpropagation process and the second backpropagation process may include backpropagation processes based on the Wirtinger derivative method (and the chain rule).

The second BPP circuit 364 may be configured to perform a fourth backpropagation process with respect to the target delay signal, based on a result of the performing of the third backpropagation process. Here, the fourth backpropagation process may indicate a backpropagation process for at least one circuit configured to perform the post-process (see the operation of the post-process circuit 340 in FIG. 5) with respect to the interference signal. The third backpropagation process and the fourth backpropagation process may include backpropagation processes based on the Wirtinger derivative method (and the chain rule).

The interference cancellation circuit 300 according to the embodiments may be implemented in various methods. In one or more embodiments, when there is no hardware limitation, the interference cancellation circuit 300 may be configured to estimate a CIR coefficient $$h_{t,m}^{next}$$

of the next sample period by calculating a Wirtinger derivative $$\frac{\partial \mathcal{L}_n}{\partial h_{t,m}^*}$$

for each error signal $e_{r,n}$ (i.e., the interference-cancelled signal). In this case, the interference cancellation circuit 300 may be configured to estimate the CIR coefficient $$h_{t,m}^{next}$$

by sharing a hardware module having a high operation processing rate or estimate the CIR coefficient $$h_{t,m}^{next}$$

based on hardware modules respectively corresponding to the delay signals. That is, the interference cancellation circuit 300 may be configured to estimate the CIR coefficients $$h_{t,m}^{next}$$

in all sample periods and update the CIR coefficients (a first case).

In one or more embodiments, according to setting, the interference cancellation circuit 300 may be configured to calculate Wirtinger derivatives $$\frac{\partial \mathcal{L}_n}{\partial h_{t,m}^*}$$

only for specific interference signals (i.e., specific interference signal samples), and may estimate the CIR coefficient $$h_{t,m}^{next}$$

in the next sample period and update the CIR coefficient (a second case).

In one or more embodiments, according to setting, the interference cancellation circuit 300 may be configured to calculate Wirtinger derivatives $$\frac{\partial \mathcal{L}_n}{\partial h_{t,m}^*}$$

only in specific sample periods, and may estimate the CIR coefficient $$h_{t,m}^{next}$$

in the next sample period and update the CIR coefficient (a third case).

Here, when there is the adaptive filter 350 in each transmission path in the second case and the third case, the interference cancellation performance of the device may be not significantly damaged. However, in this case, the CIR coefficient $$h_{t,m}^{next}$$

for the delay signal of each of the transmission paths is updated through time sharing, and there may be a need for a separate memory in which data of the transmission signal and data of the reception signal may be stored.

FIG. 5 is a diagram to describe an operation of the interference cancellation circuit 300 according to one or more embodiments.

More particularly, FIG. 5 is a diagram to describe an operation of estimating the CIR coefficients for delay signals (e.g., TS #00, TS #01, TS #02, . . . , TS #0(M-1) of respective transmission paths (e.g., the zeroth transmission path TX path #0 or the first transmission path Tx path #1) of the wireless communication device.

In FIG. 5, a first pre-process circuit 310-1 and a second pre-process circuit 310-2 may correspond to the pre-process circuit 310 illustrated in FIG. 3, and a first FIR filter 320-1 and a second FIR filter 320-2 may correspond to the FIR filter 320 illustrated in FIG. 3. The interference cancellation circuit 300 according to the embodiments may be implemented in a Hammerstein structure.

Referring to FIG. 5, the first pre-process circuit 310-1 may be configured to receive the zeroth transmission signal TS #0 through the zeroth transmission path Tx path #0. The first pre-process circuit 310-1 may be configured to perform at least one pre-process with respect to the zeroth transmission signal TS #0 and output the pre-processed zeroth transmission signal TS #0 to the first FIR filter 320-1. The second pre-process circuit 310-2 may be configured to receive the first transmission signal TS #1 through the first transmission path TX path #1. The second pre-process circuit 310-2 may be configured to perform at least one pre-process with respect to the first transmission signal TS #1 and may output the pre-processed first transmission signal TS #1 to the second FIR filter 320-2. The at least one pre-process may include an operation regarding at least one of delay matching between transmission signals (e.g., the zeroth transmission signal TS #0 and the first transmission signal TS #1) received through different transmission paths (e.g., the zeroth transmission path Tx path #0 and the first transmission path Tx path #1), delay matching between interference signals in the transmission path, adjustment on the sampling rate, and/or a combination thereof.

The first FIR filter 320-1 may be configured to generate a first delay signal TS #00 to a $L^{th}$ delay signal TS #0(L-1) by delaying the pre-processed zeroth transmission signal TS #0 by delay periods (e.g., $Z^{-1}$, $Z^{-2}$, . . . ) preset in the plurality of buffer circuits by using the plurality of buffer circuits,. Here, the preset delay period (e.g., $Z^{-1}$) may include a sample period for the interference signal. For example, the first delay signal TS #00 may include a signal (i.e., the first delay signal TS #00 is not delayed) by delaying the zeroth transmission signal TS #0 by the zeroth delay period (e.g., $Z^{-0}$) in a first delay tap, the second delay signal TS #01 may include a signal by delaying the zeroth transmission signal TS #0 by the first period (e.g., $Z^{-1}$) in the second tap, . . . , and the $L^{th}$ delay signal TS #0(L-1) may include a signal generated by delaying the zeroth transmission signal TS #0 by a L-1 delay period (e.g., Z-(L-1)) in an Lth delay tap.

The first FIR filter 320-1 may be configured to set a CIR coefficient $$h^*_{t,m}$$

corresponding to each delay signal by convoluting the CIR coefficient $$h^*_{t,m}$$

corresponding to each of the delay signals (or each delay tap) with each of the first delay signal TS #00 to the $L^{th}$ delay signal TS #0(L-1). In the CIR coefficient $$h^*_{t,m},$$

t may indicate the transmission path index, and m may indicate a delay index. For example, the first FIR filter 320-1 may be configured to set a first CIR coefficient $$h^*_{0,0}$$

corresponding to the first delay signal TS #00 by convoluting the first CIR coefficient $$h^*_{0,0}$$

with the first delay signal TS #00, set a second CIR coefficient $$h^*_{0,1}$$

corresponding to the second delay signal TS #01 by convoluting the second CIR coefficient $$h^*_{0,1}$$

with the second delay signal TS #01, . . . , and set an $L^{th}$ CIR coefficient $$h^*_{0,L-1}$$

corresponding to the $L^{th}$ delay signal TS #0(L-1) by convoluting the $L^{th}$ CIR coefficient $$h^*_{0,L-1}$$

with the $L^{th}$ delay signal TS #0(L-1).

The second FIR filter 320-2 may be configured to set a first delay signal TS #10 to an $M^{th}$ delay signal TS #1(M-1) by delaying the pre-processed first transmission signal TS #1 by each of the delay periods (e.g., Z-1, Z-2, . . . ) preset for the plurality of buffer circuits by using the plurality of buffer circuits. Here, the preset delay period (e.g., $Z^{-1}$) may include a sample period for the interference signal. For example, the first delay signal TS #10 may include a signal generated by delaying the first transmission signal TS #1 by the zeroth delay period (e.g., $Z^{-0}$) in the first delay tap, the second delay signal TS #11 may include a signal generated by delaying the first transmission signal TS #1 by the first delay period (e.g., $Z^{-1}$) in the second delay tap, . . . , and the $M^{th}$ delay signal TS #1(M-1) may include a signal generated by delaying the first transmission signal TS #1 by the M-$1^{th}$ delay period (e.g., $Z^{-(M-1)}$ in an $M^{th}$ delay tap.

The second FIR filter 320-2 may be configured to set CIR coefficients $$h^*_{t,m}$$

respectively corresponding to the delay signals by convoluting the CIR coefficients $$h^*_{t,m}$$

corresponding to respective of the delay signals with the first delay signal TS #10 to the $M^{th}$ delay signal TS #0(M-1). In the CIR coefficient $$h^*_{t,m},$$

t may indicate the transmission path index, and m may indicate a delay index. For example, the second FIR filter 320-2 may be configured to set the first CIR coefficient $$h^*_{1,0}$$

by convoluting the first CIR coefficient $$h^*_{1,0}$$

with the first delay signal TS #10, set the second CIR coefficient $$h^*_{1,1}$$

corresponding to the second delay signal TS #11 by convoluting the second CIR coefficient $$h^*_{1,1}$$

with the second delay signal TS #11, . . . , and set the $M^{th}$ CIR coefficient $$h^*_{1,M-1}$$

corresponding to the $M^{th}$ delay signal TS #1(M-1) by convoluting the $M^{th}$ CIR coefficient $$h^*_{1,M-1}$$

with the $M^{th}$ delay signal TS #1(M-1).

The first FIR filter 320-1 may be configured to generate a zeroth aggregation signal STS #0 by aggregating the first delay signal TS #00 to the Lth delay signal TS #0(L-1), for which the CIR coefficients $$h^*_{t,m}$$

are set, and transmit the zeroth aggregation signal STS #0 to the kernel generation circuit 330. The first delay signal TS #00 to the Lth delay signal TS #0(L-1) for which the CIR coefficients $$h^*_{t,m}$$

are set, may be referred to as CIR-adapted signals which are obtained by applying the CIR coefficients $$h^*_{t,m}$$

to the first delay signal TS #00 to the Lth delay signal TS #0(L-1) or by convoluting the first delay signal TS #00 to the Lth delay signal TS #0(L-1) with their corresponding the CIR coefficients $$h^*_{t,m}.$$

The zeroth aggregation signal STS #0 may be an aggregation signal of the CIR-adapted signals. The second FIR filter 320-2 may be configured to generate a first aggregation signal STS #1 by aggregating the first delay signal TS #10 to the $M^{th}$ delay signal TS #1(M-1), for which the CIR coefficients $$h^*_{t,m}$$

are set, and transmit the first aggregation signal STS #1 to the kernel generation circuit 330. Similarly, the first delay signal TS #10 to the $M^{th}$ delay signal TS #1(M-1) for which the CIR coefficients $$h^*_{t,m}$$

are set, may be CIR-adapted signals which are obtained by applying the CIR coefficients $$h^*_{t,m}$$

to the first delay signal TS #10 to the $M^{th}$ delay signal TS #1(M-1) or by convoluting the first delay signal TS #10 to the $M^{th}$ delay signal TS #1(M-1), with their corresponding the CIR coefficients $$h^*_{t,m}.$$

The first aggregation signal STS #1 may be an aggregation signal of the CIR-adapted signals.

The kernel generation circuit 330 may be configured to generate/reproduce a kernel, i.e., an interference model (or an interference basis), based on the zeroth aggregation signal STS #0 and the first aggregation signal STS #1. The generated/reproduced interference model may include both an active interference signal and a passive interference signal. The kernel generation circuit 330 may be configured to transmit the generated/reproduced interference model to the post-process circuit 340.

The post-process circuit 340 may be configured to perform at least one post-process with respect to the received interference model and transmit the post-processed interference model to the adaptive filter 350. The at least one post-process may include an operation of at least one of delay matching between the transmission signal and the reception signal, regulation on frequency offset, adjustment on the sampling rate, and/or a combination thereof.

The adaptive filter 350 may be configured to estimate/generate an interference signal, based on the post-processed interference model, and generate an interference-cancelled signal (ICS) by filtering out the interference signal from the reception signal. The adaptive filter 350 may be configured to transmit the interference-cancelled signal ICS to the CIR estimation circuit 360. The interference cancellation circuit according to the embodiments may include a cancellation circuit in place of the adaptive filter 350. The cancellation circuit may be configured to estimate the interference signal from the interference model and generate an interference-subtracted signal by simply subtracting the interference signal from the reception signal. The cancellation circuit may be configured to transmit the interference-subtracted signal to the CIR estimation circuit 360.

The CIR estimation circuit 360 may be configured to estimate a CIR coefficient $$h^*_{t,m}$$

corresponding to a delay signal of each of the transmission paths in the next sample period by using the backpropagation method based on the interference-cancelled signal ICS (or the interference-subtracted signal). For example, the CIR estimation circuit 360 may be configured to estimate the CIR coefficient $$h^*_{t,m}$$

corresponding to the delay signal of each of the transmission paths in the next sample period, by using the backpropagation method based on the Wirtinger derivative method and/or the chain rule.

To update the CIR coefficient $$h^*_{t,m}$$

corresponding to the delay signal of each of the transmission paths in the next sample period, the CIR estimation circuit 360 may transmit the estimated CIR coefficient $$h^*_{t,m}$$

to the first FIR filter 310-1 or the second FIR filter 310-2.

The CIR estimation circuit 360 according to the embodiments is configured to estimate the CIR coefficient $$h^*_{t,m}$$

for a transmission signal (or each of delay signals generated from the transmission signal) of each of the transmission paths by using the backpropagation method, and a system having relatively low complexity may be implemented.

The interference cancellation circuit 300 according to the embodiments may be configured to estimate the CIR coefficient $$h^*_{t,m}$$

for the transmission signal (or each of the delay signals generated from the transmission signal) for each of the transmission paths by using the CIR estimation circuit 360 and reflect the CIR coefficient to the interference modeling, and by doing so, may efficiently remove the IMD interference.

For convenience of explanation, the operation of estimating the coefficients $$h^*_{t,m}$$

based on two transmission paths (e.g., the zeroth transmission path TX path #0 and the first transmission path Tx path #1) is described with reference to FIG. 5 in the present disclosure, but the embodiments are not limited thereto, and the interference cancellation circuit 300 (or the CIR estimation circuit 360) according to the embodiments may be configured to estimate the CIR coefficient $$h^*_{t,m}$$

based on various numbers of transmission paths (e.g., at least one transmission path).

Figure 6:
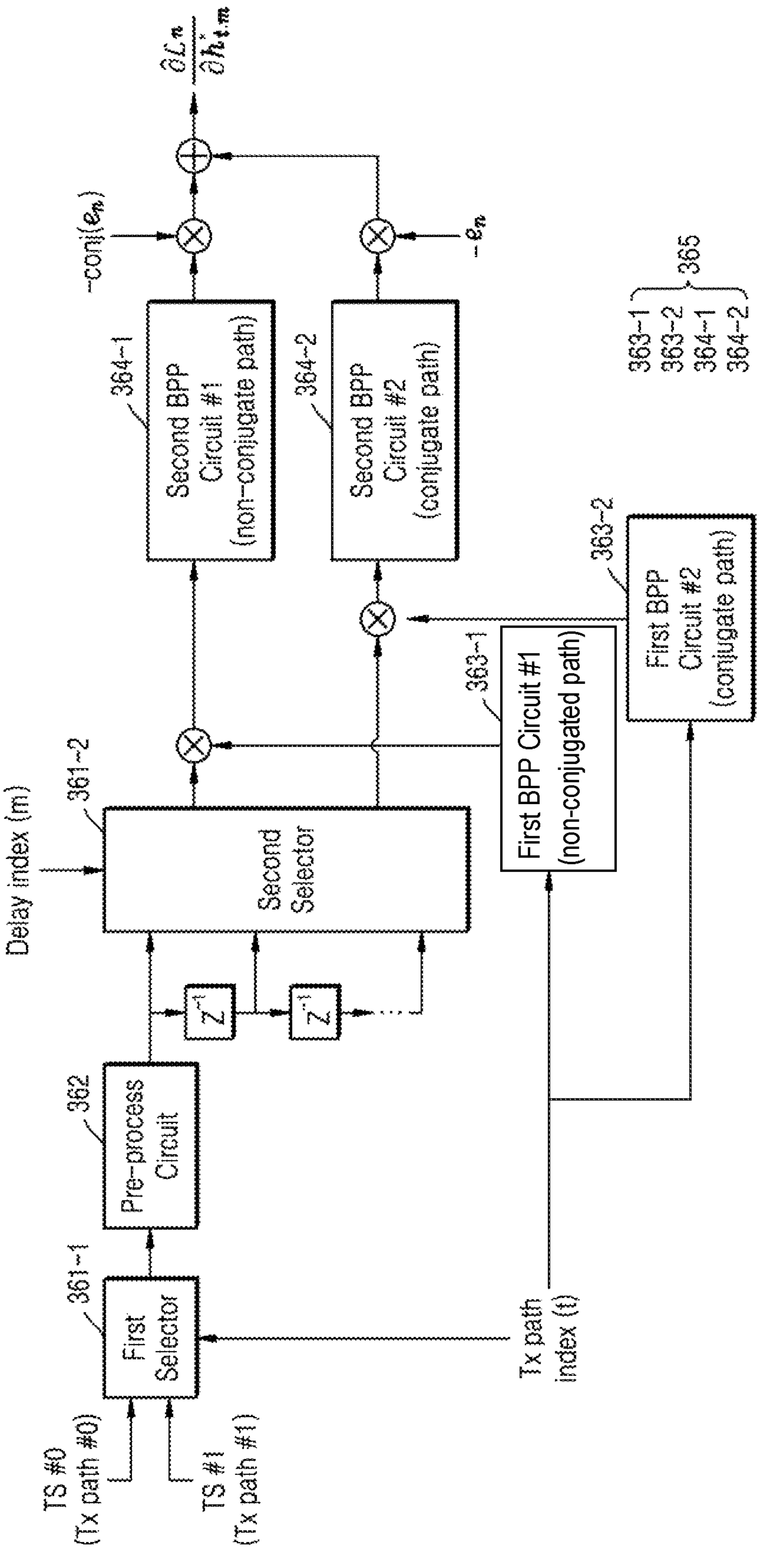
FIG. 6 is a diagram to describe operations of a CIR estimation circuit according to one or more embodiments.

FIG. 6 is a diagram to describe an operation of the CIR estimation circuit 360 according to one or more embodiments.

Figure 8:
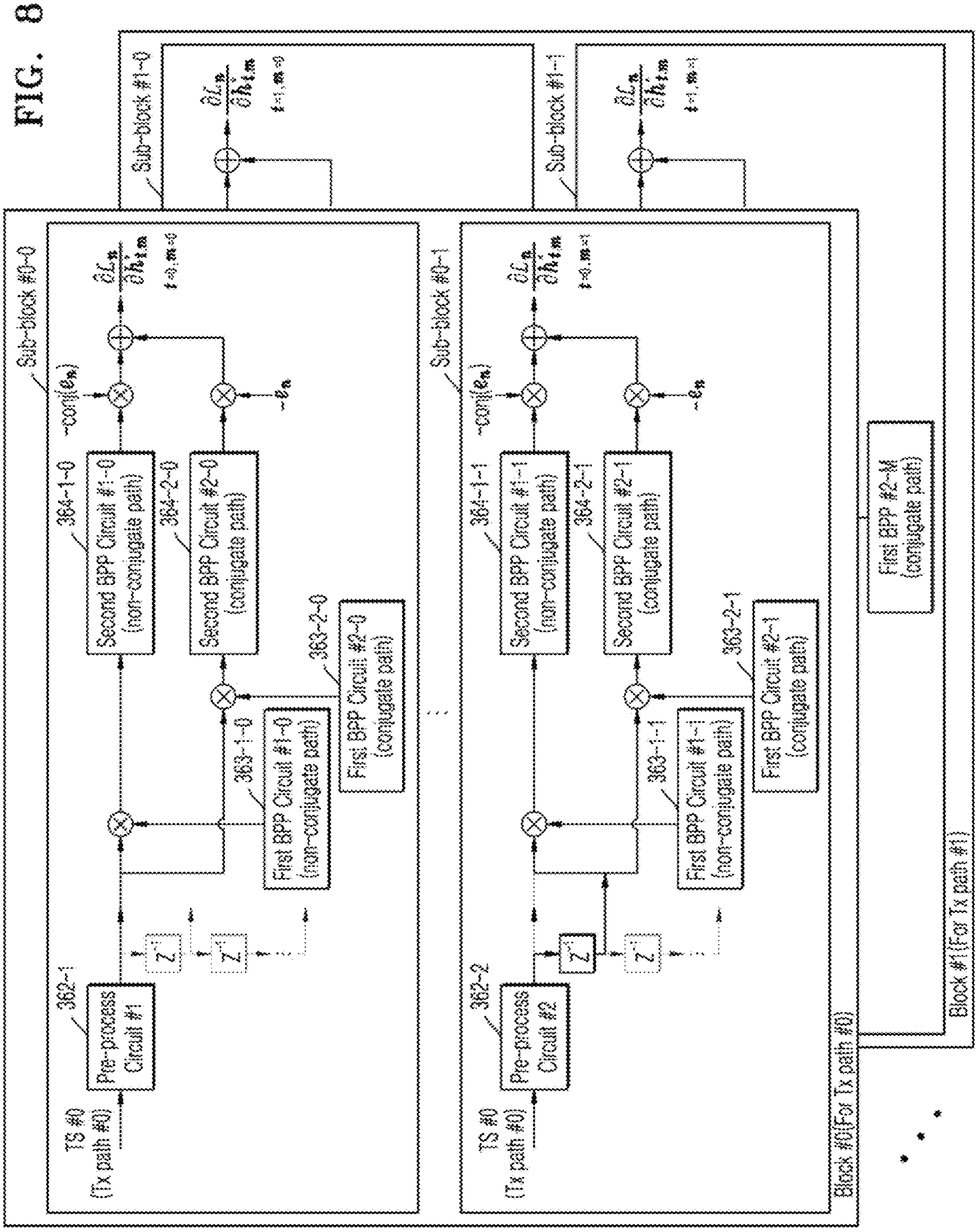
FIG. 8 illustrates an example of a configuration of a CIR estimation circuit according to one or more embodiments.

More particularly, FIG. 6 is a diagram to describe a CIR coefficient for a delay signal of each of the transmission paths (e.g., the zeroth transmission path Tx path #0 or the first transmission path Tx path #1) of the CIR estimation circuit 360. Unlike FIG. 8, FIG. 6 illustrates an example of a configuration of the CIR estimation circuit 360 including a block (e.g., hardware) configured to sequentially estimate a CIR coefficient for a delay signal of each of the transmission paths.

Referring to FIG. 6, the CIR estimation circuit 360 may include a first selector 361-1, the pre-process circuit 362, a second selector 361-2, the first BPP circuit #1 363-1, the first BPP circuit #2 363-2, the second BPP circuit #1 364-1, and the second BPP circuit #2 364-2.

The first selector 361-1 may be configured to select any one of at least one transmission path (e.g., the zeroth transmission path Tx path #0 and the first transmission path Tx path #1), based on a first index (e.g., the transmission path index t). For example, when t=0, the zeroth transmission path Tx path #0 may be selected, and when t=1, the first transmission path Tx path #1 may be selected.

The pre-process circuit 362 may be configured to perform at least one pre-process with respect to a transmission signal received through the transmission path (e.g., any one of the zeroth transmission path Tx path #0 and the first transmission path Tx path #1) selected by the first selector 361-1. The at least one pre-process may include at least one of delay matching between the transmission signals, delay matching between interference signals in the transmission paths, adjustment on a sampling rate, and/or a combination thereof. For example, when the zeroth transmission path Tx path #0 is selected by the first selector 361-1, the pre-process circuit 362 may perform at least one pre-process with respect to the zeroth transmission signal TS #0 received through the zeroth transmission path Tx path #0.

The transmission signal, on which the at least one preprocessing is performed, may be delayed by each of delay time periods (e.g., $Z^{-1}$, $Z^{-2}$, . . . ) preset for the plurality of buffers and may be input to the second selector 361-2.

The second selector 361-2 may be configured to select any one of a plurality of delay signals (e.g., when the zeroth transmission path Tx path #0 is selected by the first selector 361-1—the first delay signal TS #00 to the $L^{th}$ delay signal TS #0(L-1)), based on a second index (e.g., the delay index m). For example, when t=0 and M=0, the first delay signal TS #00 may be selected, and when t=0 and M=1, the second delay signal TS #01 may be selected.

Referring to FIG. 4, the BPP circuit 365 according to the embodiments may include the first BPP circuit #1 363-1, the first BPP circuit #2 363-2, the second BPP circuit #1 364-1, and the second BPP circuit #2 364-2.

When a backpropagation process is performed based on the interference-cancelled signal (that is, based on the adaptive filter 350), the first BPP circuit #1 363-1 and the first BPP circuit #2 363-2 may perform the first backpropagation process, and the second BPP circuit #1 364-1 and the second BPP circuit #2 364-2 may perform the second backpropagation process, based on a result of performing the first backpropagation process. The first BPP circuit #1 363-1 and the first BPP circuit #2 363-2 may be configured to perform the first backpropagation process based on the first index (e.g., the transmission path index t). The first backpropagation process may indicate a process of calculating Wirtinger derivatives for the adaptive filter 350 and the kernel generation circuit 330 in the transmission paths selected by using the backpropagation method (e.g., the chain rule and the like) based on the interference-cancelled signal received from the adaptive filter 350. The first BPP circuit #1 363-1 may include a BPP circuit for a non-conjugate path when calculating the Wirtinger derivatives for the adaptive filter 350 and the kernel generation circuit 330, and the first BPP circuit #2 363-2 may include a BPP circuit for a conjugate path when calculating the Wirtinger derivatives for the adaptive filter 350 and the kernel generation circuit 330. The operation of calculating the Wirtinger derivatives for the adaptive filter 350 and the kernel generation circuit 330 in the first BPP circuit #1 363-1 and the first BPP circuit #2 363-2 will be described below with reference to FIG. 7. The second BPP circuit #1 364-1 and the second BPP circuit #2 364-2 may be configured to perform the second backpropagation process based on a signal generated by multiplying a result of performing the first backpropagation process (i.e., an output value of the first BPP circuit #1 363-1 and the first BPP circuit #2 363-2) by a delay signal of a selected transmission path (see FIG. 6). The second backpropagation process may indicate a process of calculating a Wirtinger derivative for at least one circuit configured to perform the post-process in a selected transmission path by using the backpropagation method (e.g., the chain rule and the like) based on the result of performing the third backpropagation process (i.e., the output value of the first BPP circuit #1 363-1 and the first BPP circuit #2 363-2). The second BPP circuit #1 364-1 may include a BPP circuit for a non-conjugate path when calculating a Wirtinger derivative for at least one circuit configured to perform the post-process, and the second BPP circuit #2 364-2 may include a BPP circuit for a conjugate path when calculating a Wirtinger derivative for at least one circuit configured to perform the post-process. The operation of calculating the Wirtinger derivative for at least one circuit configured to perform the post-process in the second BPP circuit #1 364-1 and the second BPP circuit #2 364-2 will be described below with reference to FIG. 7.

When the backpropagation process is performed based on the interference-subtracted signal (that is, based on the cancellation circuit), the first BPP circuit #1 363-1 and the first BPP circuit #2 363-2 may perform the third backpropagation process, and the second BPP circuit #1 364-1 and the second BPP circuit #2 364-2 may perform the fourth backpropagation process, based on a result of performing the third backpropagation process. The first BPP circuit #1 363-1 and the first BPP circuit #2 363-2 may be configured to perform the third backpropagation process based on the first index (e.g., the transmission path index t). The third backpropagation process may indicate a process of calculating Wirtinger derivatives for the cancellation circuit and the kernel generation circuit 330 in a transmission paths selected by using the backpropagation method (e.g., the chain rule and the like) based on the interference-subtracted signal received from the cancellation circuit. The first BPP circuit #1 363-1 may include a BPP circuit for a non-conjugate path when calculating the Wirtinger derivatives for the cancellation circuit and the kernel generation circuit 330, and the first BPP circuit #2 363-2 may include a BPP circuit for a conjugate path when calculating the Wirtinger derivatives for the cancellation circuit and the kernel generation circuit 330. The operation of calculating the Wirtinger derivatives for the cancellation circuit and the kernel generation circuit 330 in the first BPP circuit #1 363-1 and the first BPP circuit #2 363-2 will be described below with reference to FIG. 7. The second BPP circuit #1 364-1 and the second BPP circuit #2 364-2 may be configured to perform the fourth backpropagation process based on a signal generated by multiplying a result of performing the third backpropagation process (i.e., an output value of the first BPP circuit #1 363-1 and the first BPP circuit #2 363-2) by a delay signal of a selected transmission path (see FIG. 6). The fourth backpropagation process may indicate a process of calculating a Wirtinger derivative for at least one circuit configured to perform the post-process in a selected transmission path by using the backpropagation method (e.g., the chain rule and the like) based on the result of performing the third backpropagation process (i.e., the output value of the first BPP circuit #1 363-1 and the first BPP circuit #2 363-2). The second BPP circuit #1 364-1 may include a BPP circuit for a non-conjugate path when calculating a Wirtinger derivative for at least one circuit configured to perform the post-process, and the second BPP circuit #2 364-2 may include a BPP circuit for a conjugate path when calculating a Wirtinger derivative for at least one circuit configured to perform the post-process. The operation of calculating the Wirtinger derivative for at least one circuit configured to perform the post-process in the second BPP circuit #1 364-1 and the second BPP circuit #2 364-2 will be described below with reference to FIG. 7.

The BPP circuit 365 may be configured to calculate a Wirtinger derivative $$\frac{\partial \mathcal{L}_n}{\partial h_{t,m}^*}$$

(see FIG. 4) based on a value obtained by multiplying an error signal, e.g., $-\text{conj}(e_n)$ or $-e_n$, respectively by output values of the second BPP circuit #1 364-1 and the second BPP circuit #2 364-2 and aggregating values obtained by the multiplication.

The BPP circuit 365 may be configured to estimate a CIR coefficient $$h_{t,m}^{next}$$

in the next sample period by putting the Wirtinger derivative $$\frac{\partial \mathcal{L}_n}{\partial h_{t,m}^*}$$

into [Equation 1] described above. The BPP circuit 365 may be configured to transmit the estimated CIR coefficient $$h_{t,m}^{next}$$

to the FIR filter 320 to update a CIR coefficient for a delay signal of each of the transmission paths based on the estimated CIR coefficient $$h_{t,m}^{next}.$$

In FIG. 6, the first selector 361-1 and the second selector 361-2 may be implemented in a number less than a total number of actual delay signals (or delay taps of the FIR filter 320) to reuse when a time-sharing method is used.

FIG. 7 is a diagram to describe an operation of the CIR estimation circuit 360 according to one or more embodiments.

More particularly, FIG. 7 is a diagram to describe an operation of calculating Wirtinger derivatives for the BPP circuit 365 (e.g., the first BPP circuit #1 363-1, the first BPP circuit #2 363-2, the second BPP circuit #1 364-1, and the second BPP circuit #2 364-2) of the CIR estimation circuit 360 and circuits of various FIR filter types (e.g., the FIR filter 320, the adaptive filter 350 (or the cancellation circuit), a filter in the post-process, and the like).

Referring to FIG. 7, the BPP circuit 365 may be configured to compute a Wirtinger derivative (non-conjugate path)

$$\frac{\partial g_n}{\partial h_{0,m}^*}$$

and a Wirtinger derivative (a conjugate path))

$$\frac{\partial g_n^*}{\partial h_{0,m}^*}$$

for each of transmission paths for the kernel generation circuit 330 by using the backpropagation method. In FIG. 7, an interference model $g_n$ (e.g., a mathematical model) corresponding to a type of interference may be '$g_n=f(y_{0,n}, y_{1,n})$'. Here, $y_{0,n}$ may indicate an output (e.g., an aggregation signal obtained by aggregating the first delay signal to the $L^{th}$ delay signal) of the FIR filter 320 in the zeroth transmission path Tx path #0, and $y_{1,n}$ may indicate an output (e.g., an aggregation signal obtained by aggregating the first delay signal to the $M^{th}$ delay signal).

Hereinafter, a case in which an aggressor TX path number is one will be described.

In one or more embodiments, when an interference type is a second harmonics model (2nd Har.), the interference model may be $$g_n = y_{0,n}^2.$$

Here, for the $m^{th}$ delay signal in the zeroth transmission path Tx path #0 (where a transmission path index t=0, the delay index m=m): a Wirtinger derivative (non-conjugate path)

$$\frac{\partial g_n}{\partial h_{0,m}^*}$$

calculated by the BPP circuit 365 may be '$2y_{0,n}x_{0,n-m}$', and a Wirtinger derivative (a conjugate path)

$$\frac{\partial g_n^*}{\partial h_{0,m}^*}$$

calculated by the BPP circuit 360 may be 'zero'.

In one or more embodiments, when an interference type is the second harmonics model (2nd Har.), the interference model may be $$g_n = y_{0,n}^2.$$

In this case, for the mth delay signal in the first transmission path Tx path #1 (where a transmission path index t=2, the delay index m=m): a Wirtinger derivative (non-conjugate path)

$$\frac{\partial g_n}{\partial h_{0,m}^*}$$

calculated by the BPP circuit 365 may be 'N/A', and a Wirtinger derivative (conjugate path)

$$\frac{\partial g_n^*}{\partial h_{0,m}^*}$$

calculated by the BPP circuit 365 may be 'N/A'.

In one or more embodiments, when an interference type is a third harmonics model (3rd Har.), the interference model may be $$, g_n = y_{0,n}^3,$$

Here, for the $m^{th}$ delay signal in the zeroth transmission path Tx path #0 (where the transmission path index t=0, the delay index m=m): a Wirtinger derivative (non-conjugate path)

$$\frac{\partial g_n}{\partial h_{0,m}^*}$$

calculated by the BPP circuit 365 may be $$3y_{0,n}^2x_{0,n-m}, ,$$

and a Wirtinger derivative (a conjugate path)

$$\frac{\partial g_n^*}{\partial h_{0,m}^*}$$

calculated by the BPP circuit 365 may be 'zero'.

In one or more embodiments, when an interference type is a third harmonics model (3rd Har.), the interference model may be $$, g_n = y_{0,n}^3, .$$

In this case, for the $m^{th}$ delay signal in the first transmission path Tx path #1 (where the transmission path index t=2, the delay index m=m): a Wirtinger derivative (non-conjugate path)

$$\frac{\partial g_n}{\partial h_{0,m}^*}$$

calculated by the BPP circuit 365 may be 'N/A', and a Wirtinger derivative (conjugate path)

$$\frac{\partial g_n^*}{\partial h_{0,m}^*}$$

calculated by the BPP circuit 365 may be 'N/A'.

In one or more embodiments, when an interference type is reciprocal mixing (3rd), the interference model may be '

$$g_n = y_{0,n}^*, .$$

Here, for the $m^{th}$ delay signal in the zeroth transmission path Tx path #0 (where the transmission path index t=0, the delay index m=m): a Wirtinger derivative (non-conjugate path)

$$\frac{\partial g_n}{\partial h_{0,m}^*}$$

calculated by the BPP circuit 365 may be 'zero', and a Wirtinger derivative (a conjugate path))

$$\frac{\partial g_n^*}{\partial h_{0,m}^*}$$

calculated by the BPP circuit 365 may be '$x_{0,n-m}$'.

In one or more embodiments, when an interference type is reciprocal mixing (3rd), the interference model may be '

$$g_n = y_{0,n}^*, .$$

In this case, for the $m^{th}$ delay signal in the first transmission path Tx path #1 (where the transmission path index t=2, the delay index m=m): a Wirtinger derivative (non-conjugate path)

$$\frac{\partial g_n}{\partial h_{0,m}^*}$$

calculated by the BPP circuit 365 may be 'N/A', and a Wirtinger derivative (conjugate path)

$$\frac{\partial g_n^*}{\partial h_{0,m}^*}$$

calculated by the BPP circuit 365 may be 'N/A'.

In one or more embodiments, when an interference type is reciprocal mixing (5th), the interference model may be '$g_n = y_{0,n}$'. Here, for the $m^{th}$ delay signal in the zeroth transmission path Tx path #0 (where the transmission path index t=0, the delay index m=m): a Wirtinger derivative (non-conjugate path) calculated by the BPP circuit 365

$$\frac{\partial g_n}{\partial h_{0,m}^*}$$

may be '$x_{0,n-m}$', and a Wirtinger derivative (a conjugate path)

$$\frac{\partial g_n^*}{\partial h_{0,m}^*}$$

calculated by the BPP circuit 365 may be 'zero'.

In one or more embodiments, when an interference type is reciprocal mixing (5th), the interference model may be '$g_n = y_{0,n}$'. In this case, for the $m^{th}$ delay signal in the first transmission path Tx path #1 (where the transmission path index t=1, the delay index m=m): the Wirtinger derivative (non-conjugate path)

$$\frac{\partial g_n}{\partial h_{0,m}^*}$$

calculated by the BPP circuit 365 may be 'N/A', and the Wirtinger derivative (conjugate path)

$$\frac{\partial g_n^*}{\partial h_{0,m}^*}$$

calculated by the BPP circuit 365 may be 'N/A'.

In one or more embodiments, when an interference type is a second order intermodulation distortion (IM2) for Aggressor TX path number 1, an interference model may be $$g_n = y_{0,n} y_{0,n}^*, .$$

Here, for the $m^{th}$ delay signal in the zeroth transmission path Tx path #0 (where the transmission path index t=0, the delay index m=m): the Wirtinger derivative (non-conjugate path) calculated by the BPP circuit 365

$$\frac{\partial g_n}{\partial h_{0,m}^*} \text{ may be, } y_{0,n}^* x_{0,n-m}, ,$$

and the Wirtinger derivative (a conjugate path)

$$\frac{\partial g_n^*}{\partial h_{0,m}^*}$$

calculated by the BPP circuit 365 may be $$, y_{0,n}^* x_{0,n-m}, .$$

In one or more embodiments, when an interference type is IM2 (second order intermodulation distortion for Aggressor TX path number: 1), an interference model may be $$g_n = y_{0,n} y^*_{0,n},.$$

In this case, for the m$^{th}$ delay signal in the first transmission path Tx path #1 (where the transmission path index t=1, the delay index m=m): the Wirtinger derivative (non-conjugate path)

$$\frac{\partial g_n}{\partial h^*_{0,m}}$$

calculated by the BPP circuit 365 may be 'N/A', and the Wirtinger derivative (conjugate path)

$$\left(\frac{\partial g^*_n}{\partial h^*_{0,m}}\right)$$

calculated by the BPP circuit 365 may be 'N/A'.

Hereinafter, a case in which an Aggressor TX path number is two will be described.

In one or more embodiments, when an interference type is a second order intermodulation distortion (IMD2 for Aggressor TX path number 2, an interference model may be $g_n = y_{0,n} y_{1,n}$'. Here, for the m$^{th}$ delay signal in the zeroth transmission path Tx path #0 (where the transmission path index t=0, the delay index m=m): a Wirtinger derivative (non-conjugate path)

$$\frac{\partial g_n}{\partial h^*_{0,m}}$$

calculated by the BPP circuit 365 '$y_{1,n} x_{0,n-m}$', and a Wirtinger derivative (a conjugate path)

$$\frac{\partial g^*_n}{\partial h^*_{0,m}}$$

calculated by the BPP circuit 365 may be 'zero'.

In one or more embodiments, when an interference type is IMD2 for Aggressor TX path number 2, an interference model may be $g_n = y_{0,n} y_{1,n}$'. Here, for the m$^{th}$ delay signal in the first transmission path Tx path #1 (where the transmission path index t=1, the delay index m=m): a Wirtinger derivative (non-conjugate path)

$$\frac{\partial g_n}{\partial h^*_{0,m}}$$

calculated by the BPP circuit 365 '$y_{0,n} x_{1,n-m}$', and a Wirtinger derivative (a conjugate path)

$$\frac{\partial g^*_n}{\partial h^*_{0,m}}$$

calculated by the BPP circuit 365 may be 'zero'.

In one or more embodiments, when an interference type is IMD2 for Aggressor TX path number 2, an interference model may be $$g_n = y_{0,n} y^*_{1,n}.$$

Here, for the m$^{th}$ delay signal in the zeroth transmission path Tx path #0 (where the transmission path index t=0, the delay index m=m): a Wirtinger derivative (non-conjugate path)

$$\frac{\partial g_n}{\partial h^*_{0,m}}$$

calculated by the BPP circuit 365 may be $$`y^*_{1,n} x_{0,n-m}',$$

and a Wirtinger derivative (a conjugate path)

$$\frac{\partial g^*_n}{\partial h^*_{0,m}}$$

calculated by the BPP circuit 365 may be 'zero'.

In one or more embodiments, when an interference type is IMD2 for Aggressor TX path number 2, an interference model may be $$g_n = y_{0,n} y^*_{1,n}.$$

Here, for the m$^{th}$ delay signal in the first transmission path Tx path #1 (where the transmission path index t=1, the delay index m=m): a Wirtinger derivative (non-conjugate path)

$$\frac{\partial g_n}{\partial h^*_{0,m}}$$

calculated by the BPP circuit 365 may be 'zero', and a Wirtinger derivative (a conjugate path))

$$\frac{\partial g^*_n}{\partial h^*_{0,m}}$$

calculated by the BPP circuit 365 may be $$`y^*_{0,n} x_{1,n-m}'.$$

In one or more embodiments, when an interference type is a third order intermodulation distortion (IMD3) for Aggressor TX path number 2, an interference model may be $$g_n = y_{0,n}(y_{1,n}^*)^2.$$

Here, for the m$^{th}$ delay signal in the zeroth transmission path Tx path #0 (where the transmission path index t=0, the delay index m=m): a Wirtinger derivative (non-conjugate path)

$$\frac{\partial g_n}{\partial h_{0,m}^*}$$

calculated by the BPP circuit 365 may be $$`(y_{1,n}^*)^2 x_{0,n-m}',$$

and a Wirtinger derivative (a conjugate path)

$$\frac{\partial g_n^*}{\partial h_{0,m}^*}$$

calculated by the BPP circuit 365 may be 'zero'.

In one or more embodiments, when an interference type is IMD3 for Aggressor TX path number 2, an interference model may be $$g_n = y_{0,n}(y_{1,n}^*)^2.$$

Here, for the m$^{th}$ delay signal in the first transmission path Tx path #1 (where the transmission path index t=1, the delay index m=m): a Wirtinger derivative (non-conjugate path)

$$\frac{\partial g_n}{\partial h_{0,m}^*}$$

calculated by the BPP circuit 365 may be 'zero', and a Wirtinger derivative (a conjugate path))

$$\frac{\partial g_n^*}{\partial h_{0,m}^*}$$

calculated by the BPP circuit 365 may be $$`2y_{0,n}y_{1,n}^* x_{1,n-m}'.$$

In one or more embodiments, when an interference type is IMD3 for Aggressor TX path number 2, an interference model may be $$g_n = y_{0,n}y_{1,n}^2, .$$

Here, for the m$^{th}$ delay signal in the zeroth transmission path Tx path #0 (where the transmission path index t=0, the delay index m=m): a Wirtinger derivative (non-conjugate path)

$$\frac{\partial g_n}{\partial h_{0,m}^*}$$

calculated by the BPP circuit 365 may be $$`y_{1,n}^2 x_{0,n-m}',$$

and a Wirtinger derivative (a conjugate path)

$$\frac{\partial g_n^*}{\partial h_{0,m}^*}$$

calculated by the BPP circuit 365 may be 'zero'.

In one or more embodiments, when an interference type is IMD3 for Aggressor TX path number 2, an interference model may be $$g_n = y_{0,n}y_{1,n}^2, .$$

Here, for the m$^{th}$ delay signal in the first transmission path Tx path #1 (where the transmission path index t=1, the delay index m=m): a Wirtinger derivative (non-conjugate path)

$$\frac{\partial g_n}{\partial h_{0,m}^*}$$

calculated by the BPP circuit 365 may be '$2y_{0,n}y_{1,n}x_{1,n-m}$', and a Wirtinger derivative (a conjugate path)

$$\frac{\partial g_n^*}{\partial h_{0,m}^*}$$

calculated by the BPP circuit 365 may be 'zero'.

In one or more embodiments, when an interference type is IMD3 for Aggressor TX path number 2, an interference model may be $$g_n = y_{0,n}^2 y_{1,n}^*, .$$

Here, for the m$^{th}$ delay signal in the zeroth transmission path Tx path #0 (where the transmission path index t=0, the delay index m=m): a Wirtinger derivative (non-conjugate path)

$$\frac{\partial g_n}{\partial h_{0,m}^*}$$

calculated by the BPP circuit 365 may be $$`2y_{0,n}y_{1,n}^* x_{1,n-m}',$$

and a Wirtinger derivative (a conjugate path)

$$\frac{\partial g_n^*}{\partial h_{0,m}^*}$$

calculated by the BPP circuit 365 may be 'zero'.

In one or more embodiments, when an interference type is IMD3 for Aggressor TX path number 2, an interference model may be $$g_n = y_{0,n}^2 y_{1,n}^*, .$$

Here, in the m$^{th}$ delay signal in the first transmission path Tx path 31 (where the transmission path index t=1, the delay index m=m): a Wirtinger derivative (non-conjugate path)

$$\frac{\partial g_n}{\partial h_{0,m}^*}$$

calculated by the BPP circuit 365 may be 'zero', and a Wirtinger derivative (a conjugate path))

$$\frac{\partial g_n^*}{\partial h_{0,m}^*}$$

calculated by the BPP circuit 365 may be $$, (y_{0,n}^*)^2 x_{1,n-m}.$$

In one or more embodiments, when an interference type is IMD3 for Aggressor TX path number 2, an interference model may be $$g_n = y_{0,n}^2 y_{1,n}.$$

Here, for the m$^{th}$ delay signal in the zeroth transmission path Tx path #0 (where the transmission path index t=0, the delay index m=m): a Wirtinger derivative (non-conjugate path)

$$\frac{\partial g_n}{\partial h_{0,m}^*}$$

calculated by the BPP circuit 365 may be '$2y_{0,n}y_{1,n}x_{0,n-m}$', and a Wirtinger derivative (a conjugate path)

$$\frac{\partial g_n^*}{\partial h_{0,m}^*}$$

calculated by the BPP circuit 365 may be 'zero'.

In one or more embodiments, when an interference type is IMD3 for Aggressor TX path number 2, an interference model may be $$g_n = y_{0,n}^2 y_{1,n},$$

Here, for the m$^{th}$ delay signal in the first transmission path Tx path #1 (where the transmission path index t=1, the delay index m=m): a Wirtinger derivative (non-conjugate path)

$$\frac{\partial g_n}{\partial h_{0,m}^*}$$

calculated by the BPP circuit 365 may be '$(y_{0,n})^2 x_{1,n-m}$', and a Wirtinger derivative (a conjugate path)

$$\frac{\partial g_n^*}{\partial h_{0,m}^*}$$

calculated by the BPP circuit 365 may be 'zero'.

In one or more embodiments, when an interference type is a fifth order intermodulation distortion (IMD5) for Aggressor TX path number 2, an interference model may be $$g_n = y_{0,n}^3 y_{0,n}^* y_{1,n}^*.$$

Here, for the m$^{th}$ delay signal in the zeroth transmission path Tx path #0 (where the transmission path index t=0, the delay index m=m): the Wirtinger derivative (non-conjugate path)

$$\frac{\partial g_n}{\partial h_{0,m}^*}$$

calculated by the BPP circuit 365

$$, 3y_{0,n}^2 y_{0,n}^* y_{1,n}^* x_{0,n-m},$$

and the Wirtinger derivative (a conjugate path)

$$\frac{\partial g_n^*}{\partial h_{0,m}^*}$$

calculated by the BPP circuit 365 may be $$, (y_{0,n}^*)^3 y_{1,n} x_{0,n-m}.$$

In one or more embodiments, when an interference type is IMD5 for Aggressor TX path number 2, an interference model may be $$g_n = y_{0,n}^3 y_{0,n}^* y_{1,n}^*.$$

Here, for the $m^{th}$ delay signal in the first transmission path Tx path #1 (where the transmission path index t=1, the delay index m=m): a Wirtinger derivative (non-conjugate path)

$$\frac{\partial g_n}{\partial h^*_{0,m}}$$

calculated by the BPP circuit 365 may be 'zero', and a Wirtinger derivative (a conjugate path))

$$\frac{\partial g^*_n}{\partial h^*_{0,m}}$$

calculated by the BPP circuit 365 may be $$,\ (y^*_{0,n})^3 y_{0,n} x_{1,n-m},\ .$$

In FIG. 7, 'N/A' may indicate a Wirtinger derivative (a non-conjugate path or a conjugate path) unnecessary for estimating the CIR coefficients, but the embodiments are not limited thereto. The BPP circuit 365 of the CIR estimation circuit 360 according to the embodiments are not limited to the interference types described above and the interference models corresponding thereto, and may be configured to calculate Wirtinger derivatives (a non-conjugate path or a conjugate path) for various interference types not disclosed in the present specifications and interference models corresponding thereto.

The BPP circuit 365 may be configured to calculate Wirtinger derivatives for outputs $O_n$ circuits of various FIR filter types (e.g., the FIR filter 320, the adaptive filter 350 (or the cancellation circuit, a filter in a post-process, and the like) by using the backpropagation method. Here, a circuit of a FIR filter type, which is a circuit included in the interference cancellation circuit 300, may indicate a circuit in which a relationship between an input $I_n$ and an output $O_n$, of the circuit is a relation like in Equation 6 below.

$$O_n = \sum_{l=0}^{L-1} h_{FIR,l} I_{n-l} \qquad \text{[Equation 6]}$$

Here, $h_{FIR,l}$ may indicate a filter coefficient.

The BPP circuit 365 may be configured to calculate a Wirtinger derivative for a circuit (e.g., the FIR filter 320, the adaptive filter 350 (or the cancellation circuit), a filter in a post-process, and the like) of a FIR filter type, based on Equation 7 and Equation 8 below.

$$\frac{\partial O_n}{\partial h^*_{t,m}} = \sum_{l=0}^{L-1} h_{FIR,l} \frac{\partial I_{n-l}}{\partial h^*_{t,m}} \qquad \text{[Equation 7]}$$

$$\frac{\partial O^*_n}{\partial h^*_{t,m}} = \sum_{l=0}^{L-1} h^*_{FIR,l} \frac{\partial I^*_{n-l}}{\partial h^*_{t,m}} \qquad \text{[Equation 8]}$$

For example, the first BPP circuit #1 363-1 may be configured to calculate a Wirtinger derivative (a non-conjugate path) for the adaptive filter 350 (or the cancellation circuit), based on [Equation 7] described above and the backpropagation method. For example, the first BPP circuit #2 363-2 may be configured to calculate a Wirtinger derivative (a conjugate path) for the adaptive filter 350 (or the cancellation circuit), based on [Equation 8] described above and the backpropagation method.

For example, the second BPP circuit #1 364-1 may be configured to calculate a Wirtinger derivative (a non-conjugate path) for the filter of the post-process, based on [Equation 7] described above and the backpropagation method. For example, the second BPP circuit #2 364-2 may be configured to calculate a Wirtinger derivative (a conjugate path) for the filter of the post-process, based on [Equation 8] described above and the backpropagation method.

When $$\frac{\partial O_n}{\partial h^*_{t,m}} = \sum_{l=0}^{L-1} h_{FIR,l} \frac{\partial I_{n-l}}{\partial h^*_{t,m}} \qquad \text{[Equation 7]}$$

$$\frac{\partial O^*_n}{\partial h^*_{t,m}} = \sum_{l=0}^{L-1} h^*_{FIR,l} \frac{\partial I^*_{n-l}}{\partial h^*_{t,m}} \qquad \text{[Equation 8]}$$

in Equation 7 and Equation 8 described above are outputs of a previous block of the circuit of the FIR filter type, the BPP circuit 365 may calculate a final Wirtinger derivative $$\frac{\partial \mathcal{L}_n}{\partial h^*_{t,m}} \text{ by calculating } \frac{\partial I_{n-l}}{\partial h^*_{t,m}} \text{ and } \frac{\partial I^*_{n-l}}{\partial h^*_{t,m}}$$

by using the backpropagation method and the chain rule (that is, Wirtinger derivatives may also be calculated by using the backpropagation method and the chain rule for remaining processes of the interference cancellation circuit 300, as described above).

Accordingly, the CIR estimation circuit 360 according to the embodiment may be configured to estimate/calculate CIR coefficients $$h^{next}_{t,m}$$

in the next sample period by putting the final Wirtinger derivative $$\frac{\partial \mathcal{L}_n}{\partial h^*_{t,m}}$$

into [Equation 1] described above.

FIG. 8 illustrates an example of a configuration of the CIR estimation circuit 360 according to one or more embodiments.

More particularly, FIG. 8 illustrates an example of a configuration of the CIR estimation circuit 360 including a plurality of blocks (e.g., hardware) configured to estimate CIR coefficients in parallel for delay signals of respective of the transmission paths.

In FIG. 8, a pre-process circuit #1 362-1 and a pre-process circuit #2 362-2 correspond to the pre-process circuit 362 shown in FIG. 6, a first BPP circuit #1-0 363-1-0 and a first BPP circuit #1-1 363-1-1 in FIG. 8 correspond to the first BPP circuit #1 363-1 shown in FIG. 6, and a first BPP circuit #2-0 363-2-0 and a first BPP circuit #2-1 363-2-1 in FIG. 8 correspond to the first BPP circuit #2 363-2 in FIG. 6. In addition, a second BPP circuit #1-0 364-1-0 and a second BPP circuit #1-1 364-1-1 in FIG. 8 correspond to the second BPP 1 364-1 in FIG. 6, and a second BPP circuit #2-0 364-2-0 and a second BPP circuit #2-1 364-2-1 in FIG. 8 correspond to the second BPP circuit #2 364-2 in FIG. 6.

Hereinafter, it is assumed that a transmission signal of the zeroth transmission path Tx path #0 is generated as L delay signals by L buffers of the FIR filter 320 and a transmission signal of the first transmission path Tx path #1 is generated as M delay signals by M buffers of the FIR filter 320.

Referring to FIG. 8, the CIR estimation circuit 360 according to the embodiments may be configured to estimate CIR coefficients in parallel for delay circuits for respective of the transmission paths. To do so, the CIR estimation circuit 360 may be implemented as blocks (e.g., a zeroth block Block #0 for the zeroth transmission path Tx path #0 and a first block Block #1 for the first transmission path Tx path #1) for respective of the transmission paths including a plurality of sub blocks. Here, the number of plurality of sub blocks included in the CIR estimation circuit 360 may be {a total number of the transmission paths (i.e., transmission antennas)*(a total number of delay signals (or delay taps) for respective of the transmission paths)}.

In one or more embodiments, each of the blocks (e.g., the zeroth block Block #0 for the zeroth transmission path Tx path #0 and the first block Block #1 for the first transmission path Tx path #1) of the CIR estimation circuit 360 may include sub blocks for estimating CIR coefficients of the delay signal for the delay signal of each of the transmission paths (or a delay tap generating a delay signal of the FIR filter 320. In one or more embodiments, the zeroth block Block #0 for the zeroth transmission path Tx path #0 may include a 0-0 sub-block Sub-block #0-0 for estimating a CIR coefficient for a first delay signal (or a first delay tap generating the first delay signal), a 0-1 sub-block Sub-block #0-1 for estimating a CIR coefficient for a second delay signal (or a second delay tap for generating the second delay signal), . . . , and a 0-L sub-block Sub-block #0-L for estimating a CIR coefficient for a $L^{th}$ delay signal (or a $L^{th}$ delay tap generating the $L^{th}$ delay signal). Here, each of the 0-0 sub-block Sub-block #0-0 and the 0-L sub-block Sub-block #0-L may include a pre-process circuit, a first BPP circuit, a second BPP circuit, and the like (see FIG. 6). For example, the 0-0 sub-block Sub-block #0-0 may include the pre-processor circuit #1 362-1, the first BPP circuit #1-0 363-1-0, the first BPP circuit #2-0 363-2-0, the second BPP circuit #1-0 364-1-0, and the second BPP circuit #2-0 364-2-0. For example, the 0-1 sub-block Sub-block #0-1 may include the pre-processor circuit #2 362-2, the first BPP circuit #1-1 363-1-1, the first BPP circuit #2-1 363-2-1, the second BPP circuit #1-1 364-1-1, and the second BPP circuit #2-1 364-2-1.

In one or more embodiments, the first block Block #1 for the first transmission path Tx path #1 may include a 1-0 sub-block Sub-block #1-0 for estimating a CIR coefficient for the first delay signal (or the first delay tap generating the first delay signal), a 1-1 sub-block for estimating a CIR coefficient for the second delay signal (or the second delay tap generating the second delay signal), . . . , and a 1-M sub-block Sub-block #1-M for estimating a CIR coefficient for the $M^{th}$ delay signal (or the $M^{th}$ delay tap generating the $M^{th}$ delay signal). Here, each of the 1-0 sub-block Sub-block #1-0 to the 1-M sub-block Sub-block #1-M may include the pre-processor circuit, the first BPP circuit, the second BPP circuit, and the like (see FIG. 6).

Figure 9:
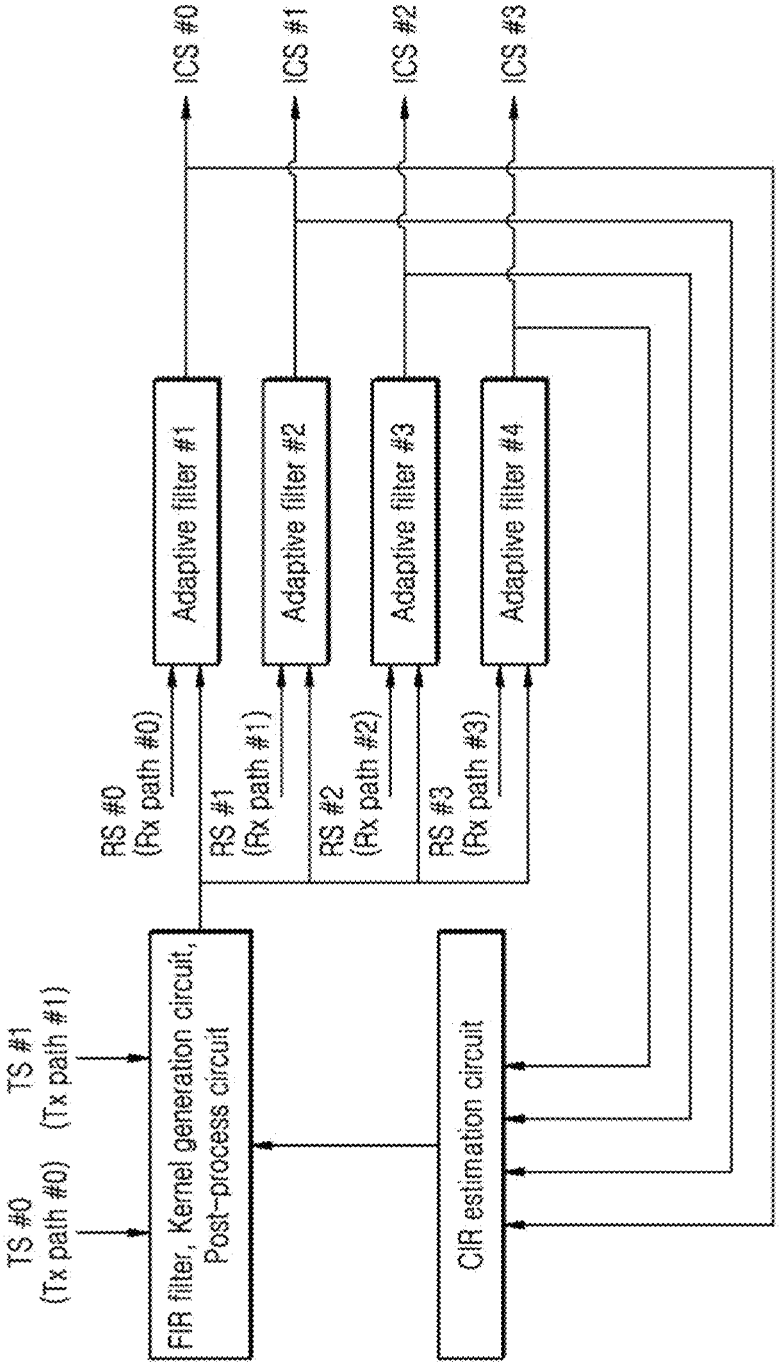
FIG. 9 illustrates an example of a configuration of an interference cancellation circuit according to one or more embodiments.

FIG. 9 illustrates an example of a configuration of the interference cancellation circuit 300 according to one or more embodiments.

A FIR filter in FIG. 9 may correspond to the FIR filter 320 in FIG. 3, a kernel generation circuit in FIG. 9 may correspond to the kernel generation circuit 330 in FIG. 3, a post-process circuit in FIG. 9 may correspond to the post-process circuit 340 in FIG. 3, an adaptive filter #1 to a fourth adaptive filter #4 in FIG. 9 may correspond to the adaptive filter 350 in FIG. 3, and a CIR estimation circuit in FIG. 9 may correspond to the CIR estimation circuit 360 in FIG. 3.

In FIG. 9, it is assumed that each of a zeroth reception signal RS #0 to a third reception signal RS #3 are respectively received through a zeroth reception path Rx path #0 to a third reception path Rx path #3.

Referring to FIG. 9, the interference cancellation circuit 300 according to the embodiments may include a common FIR filter, a kernel generation circuit, a post-process circuit, a CIR estimation circuit, and a plurality of adaptive filters corresponding respective of a plurality of reception paths. For example, the interference cancellation circuit 300 may include the common FIR filter, the kernel generation circuit, the post-process circuit, the CIR estimation circuit, an adaptive filter #1 corresponding to the zeroth reception path Rx path #0, an adaptive filter #2 corresponding to the first reception path Rx path #1, an adaptive filter #3 corresponding to the second reception path Rx path #2, and an adaptive filter #4 corresponding to the third reception path Rx path #3.

The CIR estimation circuit illustrated in FIG. 9 may be configured to receive the interference-cancelled signal #0 ICS #0 to the interference-cancelled signal #3 ICS #3 and estimate CIR coefficients for delay signals of respective of the transmission paths by using the backpropagation method based on the interference-cancelled signal #0 ICS #0 to the interference-cancelled signal #3 ICS #3. Here, the CIR estimation circuit may use the backpropagation method, based on [Equation 3] or [Equation 4] described above.

Figure 10:
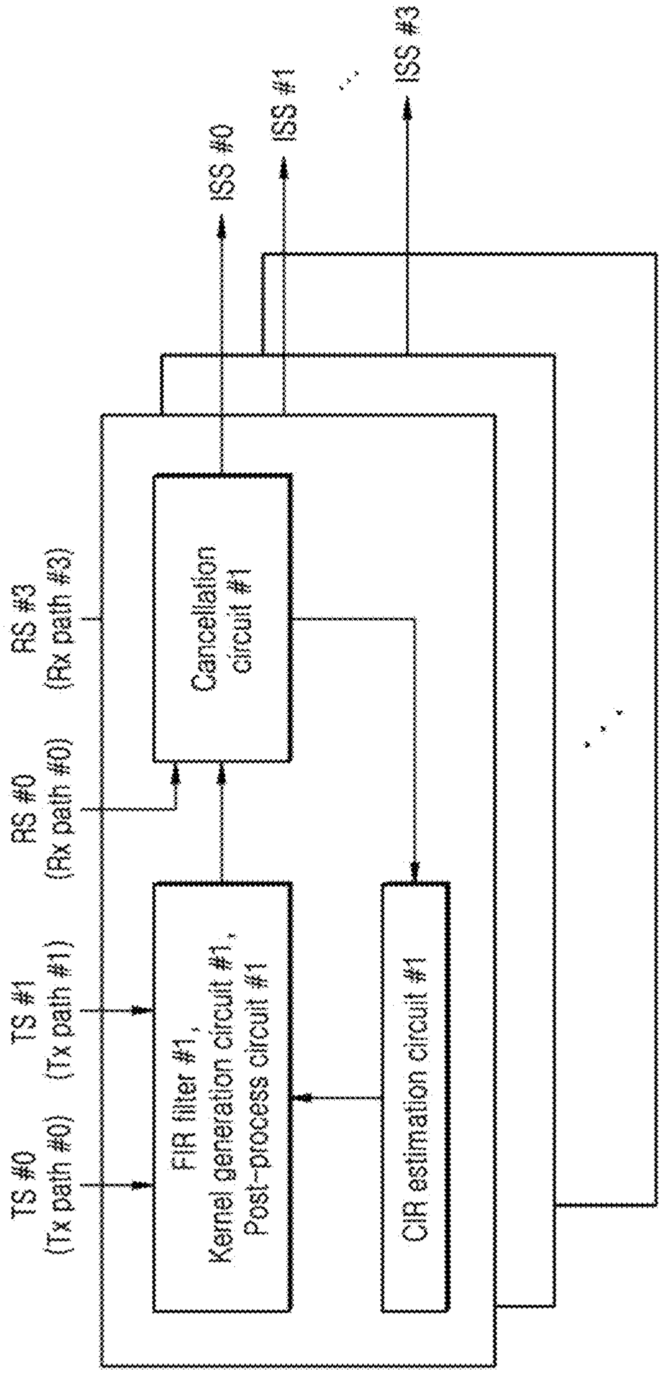
FIG. 10 illustrates another example of a configuration of an interference cancellation circuit according to one or more embodiments.

FIG. 10 illustrates another example of a configuration of an interference cancellation circuit according to one or more embodiments.

A FIR filter #1 illustrated in FIG. 10 may correspond to the FIR filter 320 illustrated in FIG. 3, a kernel generation circuit #1 illustrated in FIG. 10 may correspond to the kernel generation circuit 330 illustrated in FIG. 3, a post-process circuit #1 illustrated in FIG. 10 may correspond to the post-process circuit 340 illustrated in FIG. 3, and a CIR estimation circuit #1 illustrated in FIG. 10 may correspond to the CIR estimation circuit 360 illustrated in FIGS. 3 and 4. In the descriptions regarding the FIR filter #1, the kernel generation circuit #1, the post-process circuit #1, and the CIR estimation circuit #1 illustrated in FIG. 10, same descriptions as those with reference to FIGS. 3 and 4 may be substituted with the descriptions regarding the FIR filter 320, the kernel generation circuit 330, the post-process circuit 340 illustrated in FIG. 3, and the CIR estimation circuit 360 illustrated in FIGS. 3 and 4.

In FIG. 10, it is assumed that the zeroth reception signal RS #0 to the third reception signal RS #3 are respectively received through the zeroth reception path Rx path #0 to the third reception path Rx path #3.

Referring to FIG. 10, the interference cancellation circuit 300 according to the embodiments may include a plurality of blocks respectively corresponding to the plurality of reception paths. Here, each of the plurality of blocks may be configured to include a FIR filter, a kernel generation circuit, a post-process circuit, a CIR estimation circuit, and a cancellation circuit. Here, the cancellation circuit (in place of an adaptive filter) may be configured to estimate an interference signal based on an interference model and generate an interference-subtracted signal by subtracting the interference signal from a reception signal. In some cases, in the interference cancellation circuit 300 illustrated in FIG. 10, the CIR estimation circuit may perform some functions (e.g., a function of estimating a channel between an interference model and a reception path) of the adaptive filter. For example, in the interference cancellation circuit 300, the block corresponding to the zeroth reception path Rx path #0 may be configured to include a FIR filter #1, a kernel generation circuit #1, a post-process circuit #1, a CIR estimation circuit #1, a cancellation circuit #1. The cancellation circuit #1 may be configured to generate an interference-subtracted signal #0 ISS #0 by subtracting the interference signal from the zeroth reception signal RS #0 and transmit the generated interference-subtracted signal #0 ISS #0 to the CIR estimation circuit #1.

The FIR filter #1 may further include a plurality of buffers. For example, the FIR filter #1 may be configured to, by using the plurality of buffers, generate a first delay signal to an $n^{th}$ delay signal by delaying the reception signal by a delay period set for the plurality of buffers and set the CIR coefficients respectively corresponding to the first delay signal to the $n^{th}$ delay signal for the first delay signal to the $n^{th}$ delay signal.

The kernel generation circuit #1 may be configured to generate the interference model, based on an aggregation signal generated by aggregating the first delay signal to the $n^{th}$ delay signal for which the CIR coefficients are set.

The CIR estimation circuit #1 may be configured to estimate the CIR coefficients corresponding to the first delay signal and the $n^{th}$ delay signal in the next sample period, by using the backpropagation method based on the interference-subtracted signal #0 ISS #0, and transmit the CIR coefficients, which respectively correspond to the first delay signal to the $n^{th}$ delay signal in the next sample period, to the FIR filter #1. Here, the FIR filter #1 may be configured to update the CIR coefficients respectively corresponding to the first delay signal to the $n^{th}$ delay signal, based on the CIR coefficients in the next sample period received from the CIR estimation circuit #1. Here, the backpropagation method may indicate the backpropagation method based on the Wirtinger derivative method.

As described above, the CIR estimation circuit (e.g., the CIR estimation circuit #1) included in each of the plurality of blocks in FIG. 10 may be configured to estimate the CIR coefficients for delay signals for respective of the transmission path by using the backpropagation method based on the interference-subtracted signal (e.g., the interference-subtracted signal ISS #0) received from a cancellation circuit (e.g., the cancellation circuit #1) in a same block. Although the interference cancellation circuit 300 illustrated in FIG. 10 may be designed with higher complexity, the accuracy of estimation of the CIR coefficients may be improved when each of the reception paths includes the adaption filter.

Figure 11:
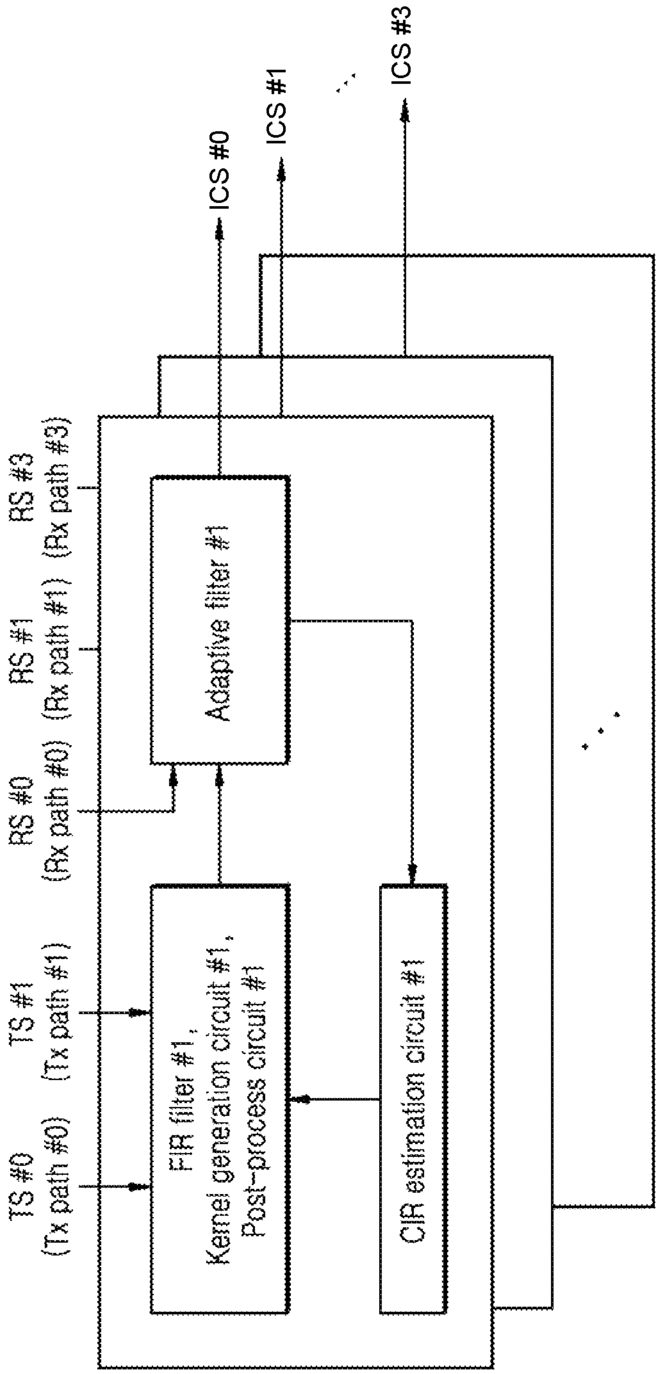
FIG. 11 illustrates another example of an interference cancellation circuit according to one or more embodiments.

FIG. 11 illustrates another example of an interference cancellation circuit according to one or more embodiments.

A FIR filter #1 illustrated in FIG. 11 may correspond to the FIR filter 320 illustrated in FIG. 3, a kernel generation circuit #1 illustrated in FIG. 11 may correspond to the kernel generation circuit 330 illustrated in FIG. 3, a post-process circuit illustrated in FIG. 11 may correspond to the post-process circuit 340 illustrated in FIG. 3, an adaptive filter #1 to an adaptive filter #4 illustrated in FIG. 4 may correspond to the adaptive filter 350 illustrated in FIG. 3, and a CIR estimation circuit #1 illustrated in FIG. 11 may correspond to the CIR estimation circuit 360 illustrated in FIG. 3.

In FIG. 11, it is assumed that the zeroth reception signal RS #0 to the third reception signal RS #3 are respectively received through the zeroth reception path Rx path #0 to the third reception path Rx path #3.

Referring to FIG. 11, the interference cancellation circuit 300 according to the embodiments may include a plurality of blocks respectively corresponding to the plurality of reception paths. Here, each of the plurality of blocks may be configured to include a FIR filter, a kernel generation circuit, a post-process circuit, a CIR estimation circuit, and an adaptive filter. For example, in the interference cancellation circuit 300, the block corresponding to the zeroth reception path Rx path #0 may be configured to include the FIR filter #1, the kernel generation circuit #1, the post-process circuit #1, the CIR estimation circuit #1, and the adaptive filter #1.

The CIR estimation circuit (e.g., the CIR estimation circuit #1) included in each of the plurality of blocks in FIG. 11 may be configured to estimate CIR coefficients for delay signals for respective of the transmission paths by using the backpropagation method based on the interference-cancelled signal (e.g., the interference-cancelled signal ICS #0) received from an adaptive filter (e.g., the adaptive filter #1) of the same block.

Figure 12:
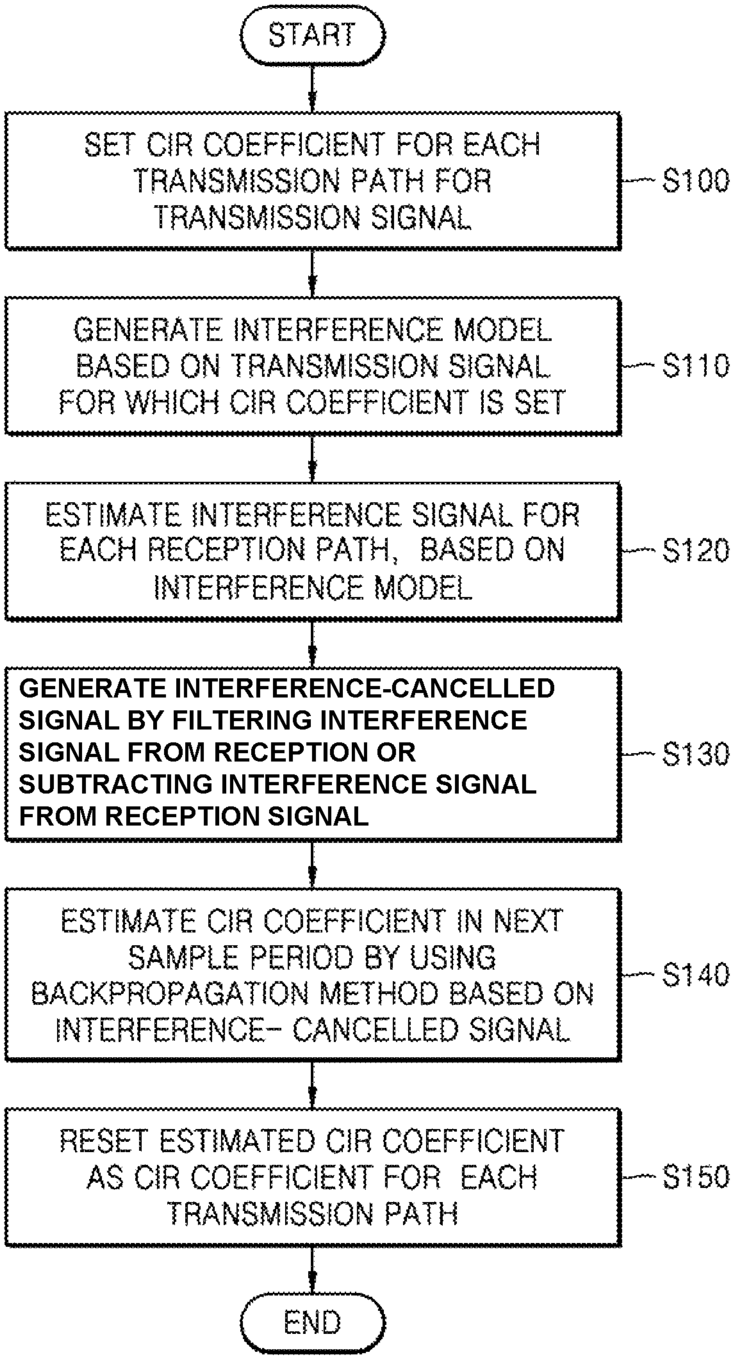
FIG. 12 is a flowchart for describing an operating method of an interference cancellation circuit according to one or more embodiments.

FIG. 12 is a flowchart for describing an operating method of the interference cancellation circuit 300 according to one or more embodiments.

Referring to FIG. 12, a method of estimating CIR coefficients for delay signals for respective of the transmission path by the interference cancellation circuit 300 may include operations S100 to S150. Among descriptions with reference to FIG. 12, same descriptions as those with reference to FIGS. 1 to 11 will be substituted with the descriptions with reference to FIGS. 1 to 11.

In operation S100, the interference cancellation circuit 300 may set a CIR coefficient for each transmission path for a transmission signal. For example, the interference cancellation circuit 300 may be configured to generate the first delay signal to the $n^{th}$ delay signal by delaying the transmission signal by each preset periods. For the first delay signal to the $n^{th}$ delay signal, the interference cancellation circuit 300 may set the CIR coefficients respectively corresponding to the first delay signal to the $n^{th}$ delay signal.

In operation S110, the interference cancellation circuit 300 may generate an interference model based on a transmission signal for which a CIR coefficient is set. For example, the interference cancellation circuit 300 may generate an aggregation signal by aggregating the first delay signal to the $n^{th}$ delay signal for which the CIR coefficients are set and generate the interference model based on the aggregation signal.

In operation S120, the interference cancellation circuit 300 may estimate an interference signal for each reception path based on the interference model. In operation S130, the interference cancellation circuit 300 (e.g., including the adaptive filter) may generate the interference-cancelled signal by filtering out an interference signal from a reception signal. For another example, in operation S130, the interference cancellation circuit 300 (e.g., including the cancellation circuit) may generate the interference-subtracted signal by subtracting the interference signal from the reception signal, in place of operation S130 (e.g., generating an adaptive filter-based interference-cancelled signal).

In operation S140, the interference cancellation circuit 300 may estimate the CIR coefficients in a next sample period by using the backpropagation method based on the interference-cancelled signal (or interference-subtracted signal). In operation S150, the interference cancellation circuit 300 may update the estimated CIR coefficients to CIR coefficients for respective of the transmission path. For example, the interference cancellation circuit 300 may estimate CIR coefficients respectively corresponding to the first delay signal to the $n^{th}$ delay signal in the next sample period by using the backpropagation method based on the interference-cancelled signal (or the interference-subtracted signal). The interference cancellation circuit 300 may update each of the estimated CIR coefficients in the next sample period to the CIR coefficient corresponding to each of the first delay signal to the $n^{th}$ delay signal.

In one or more embodiments, when the plurality of reception signals are received through the plurality of reception paths, the interference cancellation circuit 300 may generate a plurality of interference-cancelled signals by filtering out an interference signal from each of the plurality of reception signals. The interference cancellation circuit 300 may estimate the CIR coefficient by using the backpropagation method based on the plurality of interference-cancelled signal to which a preset weight is applied (see Equation 3).

In one or more embodiments, when a plurality of reception signals are received through the plurality of reception paths, the interference cancellation circuit 300 may identify a reception signal against which interference is the strongest from among the plurality of reception signals and generate a target interference-cancelled signal by filtering out the interference signal from the reception signal against which interference is the strongest. The interference cancellation circuit 300 may estimate the CIR coefficient by using the backpropagation method based on the target interference-cancelled signal (see Equation 4).

In one or more embodiments, when the plurality of reception signals are received through the plurality of reception paths, the interference cancellation circuit 300 may include a FIR filter, a kernel generation circuit, a plurality of adaptive filters respectively corresponding to the plurality of reception paths, and a CIR estimation circuit.

In one or more embodiments, when the plurality of reception signals are received through the plurality of reception signals, the interference cancellation circuit 300 may include a plurality of blocks respectively corresponding to the plurality of reception paths, and each of the plurality of blocks may include a FIR filter, a kernel generation circuit, a cancellation circuit, and a CIR estimation circuit estimating the CIR coefficient by using the backpropagation method based on an interference-subtracted signal. In this case, the cancellation circuit may generate the interference-subtracted signal by subtracting an interference signal from a reception signal received from any one path from among the plurality of reception paths.

In one or more embodiments, when a plurality of reception signals are received through a plurality of reception paths, the interference cancellation circuit 300 may include a plurality of blocks respectively corresponding to the plurality of reception paths, and each of the plurality of blocks may include a FIR filter, a kernel generation circuit, an adaptive filter, and a CIR estimation circuit.

In one or more embodiments, the backpropagation method may include the backpropagation method based on the Wirtinger derivative method (and the chain rule).

According to the CIR estimation circuit 360, the interference cancellation circuit 300, and operating methods of the same, according to various embodiments, IMD interference may be effectively cancelled by estimating a CIR coefficient for each transmission path and reflecting the CIR coefficient to interference modeling, structures may be briefly configured, and may be implemented with low system complexity.

Figure 13:
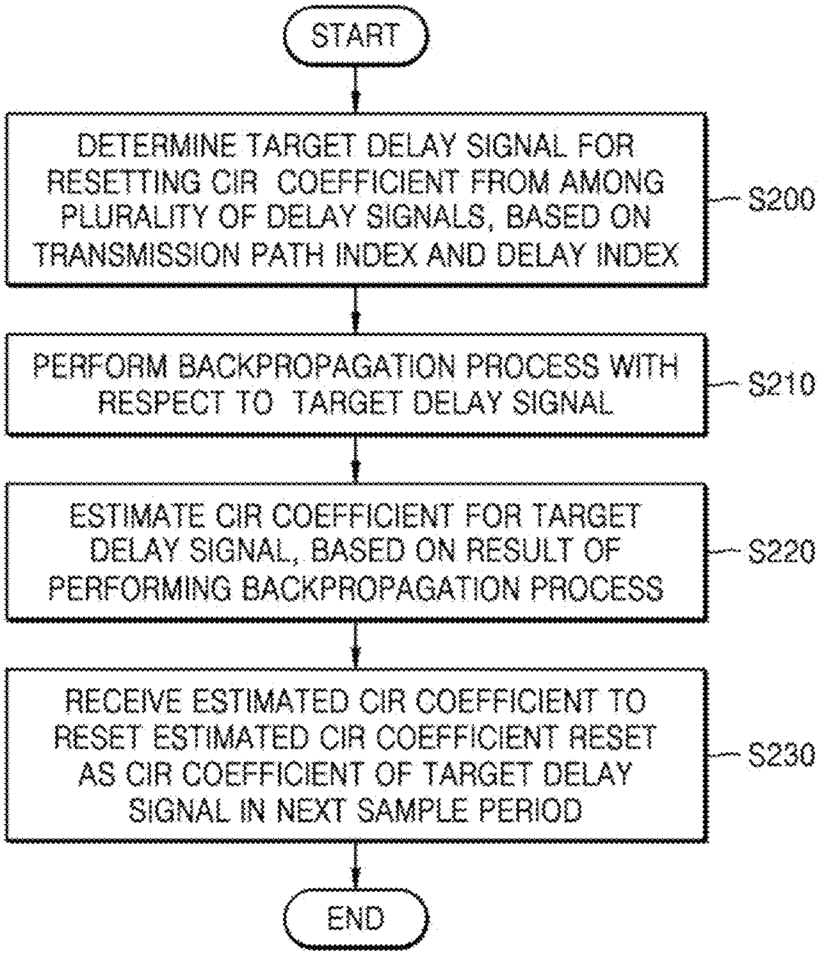
FIG. 13 is a flowchart for describing an operating method of a CIR estimation circuit according to one or more embodiments.

FIG. 13 is a flowchart for describing an operating method of the CIR estimation circuit 360 according to one or more embodiments.

Referring to FIG. 13, a method of estimating a CIR coefficient for a delay signal for each of the transmission paths by the CIR estimation circuit 360 may include operations S200 to S230. Among descriptions with reference to FIG. 13, same descriptions as those with reference to FIGS. 1 to 12 will be substituted with the descriptions with reference to FIGS. 1 to 12.

In operation S200, the CIR estimation circuit 360 may determine a target delay signal for updating the CIR coefficient from among a plurality of delay signals, based on the transmission path index and the delay index.

In operation S210, the CIR estimation circuit 360 may perform a backpropagation process for the target delay signal.

In one or more embodiments, the CIR estimation circuit 360 may perform the backpropagation process for the target delay signal, based on the interference-cancelled signal. For example, the CIR estimation circuit 360 may perform a first backpropagation process for an adaptive filter configured to filter out an interference signal from a reception signal and a kernel generation circuit configured to generate an interference model corresponding to the interference signal. The CIR estimation circuit 360 may perform a second backpropagation process for at least one circuit configured to perform a post-process with respect to the interference signal, based on a result of the performing of the first backpropagation process.

In one or more embodiments, the CIR estimation circuit 360 may perform a backpropagation process for the target delay signal, based on the interference-subtracted signal. For example, the CIR estimation circuit 360 may perform a third backpropagation process for a cancellation circuit configured to subtract an interference signal from a reception signal and a kernel generation circuit configured to generate an interference model corresponding to the interference signal. The CIR estimation circuit 360 may perform a fourth backpropagation process for at least one circuit configured to perform a post-process with respect to the interference signal, based on a result of the performing of the third backpropagation process.

In operation S220, the CIR estimation circuit 360 may estimate a CIR coefficient for the target delay signal, based on a result of performing of the backpropagation processes. Here, the backpropagation process may indicate a process by using a backpropagation method based on the Wirtinger derivative method.

In one or more embodiments, when a backpropagation process is performed based on the interference-cancelled signal, the CIR estimation circuit 360 may estimate a CIR coefficient for the target delay signal based on a result of the performing of the second backpropagation process.

In one or more embodiments, when a backpropagation process is performed based on the interference-subtracted signal, the CIR estimation circuit 360 may estimate a CIR coefficient for the target delay signal based on a result of the performing of the fourth backpropagation process.

In operation S230, the CIR estimation circuit 360 may transmit the estimated CIR coefficient to the FIR filter to update the estimated CIR coefficient as a CIR coefficient of the target delay signal in a next sample period.

Figure 14:
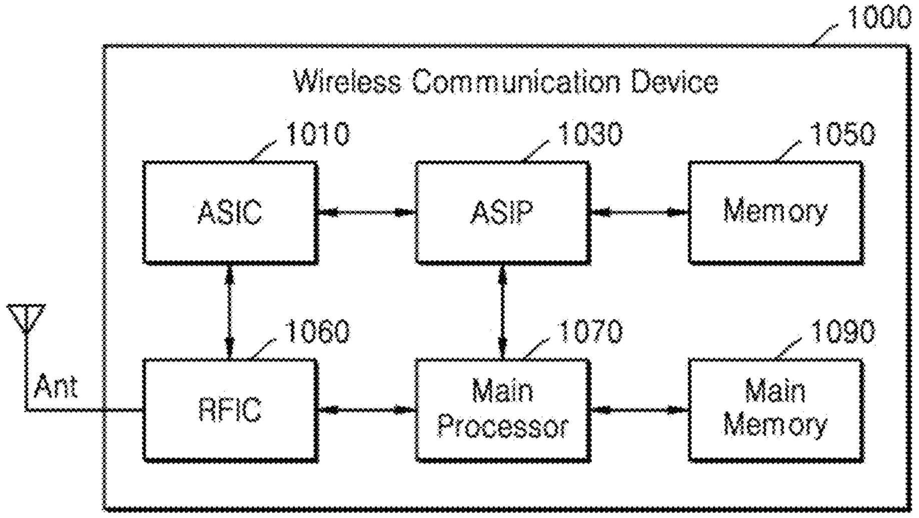
FIG. 14 is a block diagram of a wireless communication device according to one or more embodiments.

FIG. 14 is a block diagram of a wireless communication device 1000 according to one or more embodiments.

Referring to FIG. 14, the wireless communication device 1000 may include a MODEM and a Radio Frequency Integrated Circuit (RFIC) 1060, and the MODEM may include an Application Specific Integrated Circuit (ASIC) 1010, an Application Specific Instruction set Processor (ASIP) 1030, a memory 1050, a main processor 1070, and a main memory 1090. The wireless communication device 1000 illustrated in FIG. 14 may include the wireless communication device 10 according to one or more embodiments.

The wireless communication device (e.g., the MODEM) 1000 according to the embodiments may be configured to estimate a CIR coefficient by using a backpropagation method (e.g., backpropagation method based on the Wirtinger derivative and the chain rule) with respect to a delay signal for each transmission path and effectively remove an interference signal by reflecting the estimated CIR coefficient to a reflection model. For example, the main processor 1070 may include the interference cancellation circuit 300 illustrated in FIGS. 2 and 3, to estimate the CIR coefficient through the backpropagation method.

The RFIC 1060 may be connected to an antenna Ant and configured to receive/transmit signals from/to outside by using a wireless communication network. The ASIP 1030, which is an integrated circuit customized for specific purposes, may be configured to support dedicated instruction sets for specific applications and execute instructions included in the instruction sets. The memory 1050 may be configured to communicate with the ASIP 1030, and may also be configured to store a plurality of instructions executed by the ASIP 1030 as a non-transitory storage device. For example, the memory 1050 may include arbitrary types of memory devices accessible by the ASIP 1030, as non-limiting examples, a random access memory (RAM), a read only memory (ROM), a tape, a magnetic disk, an optical disc, a volatile memory, a nonvolatile memory, and combinations thereof.

The main processor 1070 may be configured to control the wireless communication device 1000 by executing a plurality of instructions. For example, the main processor 1070 may be configured to control the ASIC 1010 and the ASIP 1030, and may also be configured to process data received through the wireless communication network or user inputs to the wireless communication device 1000.

The main memory 1090 may be configured to communicate with the main processor 1070, and may also be configured to store a plurality of instructions executed by the main processor 1070 as a non-transitory storage device. For example, the For example, the main memory 1090 may include, but is not limited to, arbitrary types of memory devices accessible by the main processor 1070 a random access memory (RAM), a read only memory (ROM), a tape, a magnetic disc, an optical disc, a volatile memory, a nonvolatile memory, and combinations thereof.

As described above, example embodiments have been disclosed in the drawings and the specification. Although the embodiments were described herein by using specific terms, the terms are only used to describe the inventive concept and not to define meanings or limit the scope of the inventive concept written in the claims. It will be understood to those of skill in the art that various modifications and other equivalent embodiments may be made therefrom. Accordingly, the technical scope of the inventive concept will be determined according to technical spirit of the following claim.

While the inventive concept has been particularly shown and described with reference to embodiments thereof, it will be understood that various changes in form and details may be made therein without departing from the spirit and scope of the following claims.

What is claimed is:

1. An interference cancellation circuit comprising:

a finite impulse response (FIR) filter configured to set a channel impulse response (CIR) coefficient for each transmission path for a transmission signal and obtain a CIR-adapted transmission signal by applying the CIR coefficient to the transmission signal in each transmission path;

a kernel generation circuit configured to generate an interference model based on the CIR-adapted transmission signal;

an adaptive filter configured to estimate an interference signal for each reception path by estimating an interference model coefficient for the interference model and generate an interference-cancelled signal by filtering out the interference signal from a reception signal; and a CIR estimation circuit configured to estimate the CIR coefficients in a next sample period based on the interference-cancelled signal through a backpropagation method and transmit the estimated CIR coefficients to the FIR filter.

2. The interference cancellation circuit of claim 1, wherein the FIR filter comprises a plurality of buffers and is further configured to:

generate a first delay signal to a $n^{th}$ delay signal by delaying the transmission signal using the plurality of buffers, wherein the plurality of buffers are set with different delay periods, and set the CIR coefficient for each of the first delay signal to the nth delay signal.

3. The interference cancellation circuit of claim 2, wherein the kernel generation circuit is further configured to generate the interference model based on an aggregation signal generated by aggregating the first delay signal to the $n^{th}$ delay signal to which the CIR coefficients are applied, and wherein n is a natural number greater than or equal to 2.

4. The interference cancellation circuit of claim 3, wherein the CIR estimation circuit is further configured to:

estimate the CIR coefficients respectively corresponding to the first delay signal to the $n^{th}$ delay signal in the next sample period by using the backpropagation method based on the interference-cancelled signal; and transmit the CIR coefficients, which respectively correspond to the first delay signal to the $n^{th}$ delay signal in the next sample period, to the FIR filter, and wherein the FIR filter is further configured to update existing CIR coefficients respectively corresponding to the first delay signal to the $n^{th}$ delay signal, to the CIR coefficients estimated by the CIR estimation circuit for the next sample period.

5. The interference cancellation circuit of claim 1, wherein, when a plurality of reception signals are received through a plurality of reception paths, the interference cancellation circuit comprises the FIR filter, the kernel generation circuit, a plurality of adaptive filters respectively corresponding to the plurality of reception paths, and the CIR estimation circuit.

6. The interference cancellation circuit of claim 1, wherein, when a plurality of reception signals are received through a plurality of reception paths, the interference cancellation circuit comprises a plurality of blocks respectively corresponding to the plurality of reception paths, and wherein each of the plurality of blocks comprises a FIR filter, a kernel generation circuit, an adaptive filter, and athe CIR estimation circuit.

7. The interference cancellation circuit of claim 1, wherein the backpropagation method is performed based on a Wirtinger derivative method.

8. An interference cancellation circuit comprising:

a finite impulse response (FIR) filter configured to set a channel impulse response (CIR) coefficient for each transmission path for a transmission signal and obtain a CIR-adapted transmission signal by applying the CIR coefficient to the transmission signal in each transmission path;

a kernel generation circuit configured to generate an interference model based on the CIR-adapted transmission signal;

a cancellation circuit configured to generate an interference-subtracted signal by subtracting an interference signal, which is estimated based on the interference model, from a reception signal; and a CIR estimation circuit configured to estimate the CIR coefficients in a next sample periods by using a backpropagation method based on the interference-subtracted signal, and transmit the estimated CIR coefficients to the FIR filter.

9. The interference cancellation circuit of claim 8, wherein the FIR filter comprises a plurality of buffers and is further configured to:

generate a first delay signal to a $n^{th}$ delay signal by delaying the transmission signal using the plurality of buffers, wherein the plurality of buffers are set with different delay periods, and set the CIR coefficient for each of the first delay signal to the nth delay signal, wherein n is a natural number greater than or equal to 2.

10. The interference cancellation circuit of claim 9, wherein the kernel generation circuit is further configured to generate the interference model based on an aggregation signal generated by aggregating the first delay signal to the $n^{th}$ delay signal to which the CIR coefficients are applied.

11. The interference cancellation circuit of claim 10, wherein the CIR estimation circuit is further configured to:

estimate the CIR coefficients respectively corresponding to the first delay signal to the $n^{th}$ delay signal in the next sample period by using the backpropagation method based on the interference-subtracted signal;

transmit the CIR coefficients, which respectively correspond to the first delay signal to the $n^{th}$ delay signal in the next sample period, to the FIR filter; and wherein the FIR filter is configured to update existing CIR coefficients respectively corresponding to the 1st delay signal to the $n^{th}$ delay signal, to the CIR coefficients estimated by the CIR estimation circuit for the next sample period.

12. The interference cancellation circuit of claim 8, wherein when a plurality of reception signals are received through a plurality of reception paths, the interference cancellation circuit comprises a plurality of blocks respectively corresponding to the plurality of reception paths, and wherein each of the plurality of blocks comprises a FIR filter, a kernel generation circuit, a cancellation circuit, and a CIR estimation circuit configured to estimate the CIR coefficients by using the backpropagation method based on a corresponding interference-subtracted signal.

13. The interference cancellation circuit of claim 8, wherein the backpropagation method is performed based on a Wirtinger derivative method.

14. An operating method of a channel impulse response (CIR) estimation circuit, the operating method comprising:

generating, based on a transmission path index and a delay index, a target delay signal for updating CIR coefficients from among a plurality of delay signals;

performing a backpropagation process on the target delay signal;

estimating, based on a result of the performing of the backpropagation process, a CIR coefficient for the target delay signal; and transmitting the estimated CIR coefficient to a finite impulse response (FIR) filter to update the estimated CIR coefficient to a CIR coefficient of the target delay signal in a next sample period.

15. The operating method of claim 14, wherein the performing the backpropagation process comprises performing the backpropagation process based on an interference-cancelled signal.

16. The operating method of claim 15, wherein the performing the backpropagation process based on the interference-cancelled signal comprises:

performing a first backpropagation process on an adaptive filter configured to filter out an interference signal from a reception signal and a kernel generation circuit configured to generate an interference model corresponding to the interference signal, and performing a second backpropagation process on at least one circuit configured to perform a post-process on the interference signal, based on a result of the performing of the first backpropagation process, and the estimating of the CIR coefficient comprises estimating the CIR coefficient for the target delay signal, based on a result of the performing of the second backpropagation process.

17. The operating method of claim 15, wherein the plurality of delay signals indicate delay signals generated by delaying a transmission signal by a delay period set in each of a plurality of delay circuits.

18. The operating method of claim 14, wherein the performing the backpropagation process comprises performing the backpropagation process based on an interference-subtracted signal.

19. The operating method of claim 18, wherein the performing of the backpropagation process based on the interference-subtracted signal comprises:

performing a third backpropagation process on a cancellation circuit configured to subtract an interference signal from a reception signal and a kernel generation circuit configured to generate an interference model corresponding to the interference signal, performing a fourth backpropagation process on at least one circuit configured to perform a post-process on the interference signal, based on a result of the performing of the third backpropagation process, and wherein the estimating of the CIR coefficient is performed based on a result of the performing of the fourth backpropagation process.

20. The operating method of claim 18, wherein the backpropagation process is performed based on a Wirtinger derivative method.

* * * * *